United States Patent [19]
König

[11] Patent Number: 5,825,101
[45] Date of Patent: Oct. 20, 1998

[54] ELECTRICAL LINE SYSTEM

[75] Inventor: Herbert König, München, Germany

[73] Assignee: Dr. Fischer Aktiengesellschaft, Liechtenstein, Germany

[21] Appl. No.: 492,032

[22] PCT Filed: Dec. 2, 1993

[86] PCT No.: PCT/EP93/03395

§ 371 Date: Jun. 30, 1995

§ 102(e) Date: Jun. 30, 1995

[87] PCT Pub. No.: WO94/16484

PCT Pub. Date: Jul. 21, 1994

[30] Foreign Application Priority Data

Dec. 30, 1992 [DE] Germany .......................... 42 44 569.8
Jan. 29, 1993 [DE] Germany .......................... 43 02 558.7
May 4, 1993 [DE] Germany .......................... 43 14 718.6

[51] Int. Cl.$^6$ ...................................................... H04B 3/30
[52] U.S. Cl. ................................................. 307/91; 333/12
[58] Field of Search ..................... 307/326–328, 307/89–91, 147; 333/12; 361/107, 108, 146; 174/32–34, 35 R, 36, 40 R, 43, 44, 45 R

[56] References Cited

U.S. PATENT DOCUMENTS

| | | | |
|---|---|---|---|
| 3,869,621 | 3/1975 | Wilson | 307/147 |
| 5,068,543 | 11/1991 | Ohkawa | 307/91 |
| 5,360,998 | 11/1994 | Walling | 307/91 |
| 5,391,929 | 2/1995 | Kaylon et al. | 307/91 |
| 5,574,250 | 11/1996 | Hardie et al. | 174/36 |

Primary Examiner—Richard T. Elms
Attorney, Agent, or Firm—Robert W. Becker & Associates

[57] ABSTRACT

An electrical line system has at least one magnetically compensated line system unit with at least two main conductors for transmitting electrical energy and further has at least one auxiliary conductor extending parallel to the at least two main conductors. The at least two main conductors and the at least one auxiliary conductor are phase-synchronized when the at least one auxiliary conductor carries current during operation of the electrical line system. The at least two main conductors and the at least one auxiliary conductor are arranged in a spatial arrangement relative to a first reference point in a first space extending parallel to the electrical line system, and the currents flowing in the at least two main conductors and the at least one auxiliary conductor are selected such that a vector sum of the magnetic field components emanating from the at least two main conductors and the at least one auxiliary conductor is substantially equal to zero at the first reference point. The spatial arrangement is defined by a distance between the at least two main conductors and the at least one auxiliary conductor relative to the first reference point and by a spatial distribution of the at least two main conductors and the at least one auxiliary conductor relative to the first reference point.

40 Claims, 23 Drawing Sheets

ELECTRICAL LINE SYSTEM

BACKGROUND OF THE INVENTION

The present invention concerns an electrical line system for the transmission of low frequency electrical energy, with at least two conductors. In this instance, low frequencies are understood to be frequencies used as standard for railway traction current supply (16⅔ Hz) and for general current supply (50 Hz or 60 Hz). However, the invention is also significant for line systems transmitting direct current, such as is used for example in the application referred to as the 700 kV network. This application can be seen as the boundary limit for the definition of "low frequency". The effects of the magnetic fields occurring as a consequence of such energy transmission systems can in fact also be disruptive. The invention is also of interest for those line systems in which for reasons of obtaining reduced transformer dimensions, for example, the operating frequency level is 40 kHz and above.

As made clear by the numerous bibliographical references in the book "Elektrischer Strom als Umweltfaktor" by K önig/Folkerts, Pflaum-Verlag Munich, 1992, the presumption today is that above all magnetic, but also to a certain degree, electrical fields generated by current supply can in various circumstances have a negative effect on living organisms.

The main aspects under discussion in this case are cross-country lines in the high-voltage system and intermediate-high-voltage system and domestic current supply, when these are configured as overhead lines. However, a comparable situation may arise in relation to magnetic and electrical fields in the domestic environment too, despite the fact that the currents in this sphere which give rise to fields are usually of considerably lower intensity. The reason why this situation may occur is that in the domestic environment, the distances between people and current-carrying lines are considerably shorter.

The task of the present invention is to counter these difficulties.

SUMMARY OF THE INVENTION

The electrical line system of the present invention is primarily characterized by:

at least one magnetically compensated line system unit comprising at least two main conductors for transmitting electrical energy and further comprising at least one auxiliary conductor extending parallel to the at least two main conductors;

the at least two main conductors and the at least one auxiliary conductor being phase-synchronized when the at least one auxiliary conductor carries current during operation of the electrical line system;

wherein the at least two main conductors and the at least one auxiliary conductor are arranged in a spatial arrangement relative to a first reference point in a first space extending parallel to the electrical line system, and wherein the currents flowing in the at least two main conductors and the at least one auxiliary conductor are selected such that a vector sum of the magnetic field components emanating from the at least two main conductors and the at least one auxiliary conductor is substantially equal to zero at the first reference point; and wherein the spatial arrangement is defined by a distance between the at least two main conductors and the at least one auxiliary conductor relative to the first reference point and by a spatial distribution of the at least two main conductors and the at least one auxiliary conductor relative to the first reference point.

Preferably, at least one of the two main conductors is a split conductor that is split into at least two single conductors and at least one of the remaining main conductors is an unsplit conductor. One of the single conductors functions as the at least one auxiliary conductor. The spatial arrangement of the at least two single conductors is determined as a function of the currents flowing in the unsplit conductor and the at least two single conductors such that the magnetic field of the unsplit conductor is at least approximately compensated by the magnetic field of the single conductors in the first space extending parallel to the electrical line system.

Advantageously, the currents in the single conductors are in phase and the single conductors are positioned on opposite sides of the plane defined by a longitudinal extension of the at least one unsplit main conductor and the first reference point.

The ends of the single conductors are expediently short-circuited to one another. Expediently, the single conductors have substantially identical electrical resistance and are positioned mirror-symmetrical to the plane.

In an alternative embodiment, the currents in the single conductors are in phase opposition and the single conductors are positioned on a same side of the plane defined by a longitudinal extension of the at least one unsplit main conductor and the first reference point.

The electrical line system preferably further comprises an electrical power supply connected between the single conductors, wherein the current of the power supply is phase-synchronized with the current transmitted with the electrical line system.

Preferably, at least one magnetically non-compensated line system unit is provided, wherein the at least one magnetically compensated line system unit and the at least one magnetically non-compensated line system unit extend substantially parallel to one another. The magnetic fields of the at least one magnetically compensated line system unit and at least one magnetically non-compensated line system unit act on the first space extending parallel to the electrical line system. The at least one magnetically compensated line system unit has a spatial arrangement such that at least partially a compensation of the magnetic fields of the magnetically non-compensated line system unit is achieved.

The at least two main conductors for transmitting electrical energy and the at least one auxiliary conductor are arranged in a stacked arrangement relative to the plane defined by a center line of the first space and a center line of the electrical line system or, in the alternative, are arranged adjacent to one another in the plane defined by a center line of the first space and a center line of the electrical line system.

Preferably, the at least two main conductors and the at least one auxiliary conductor are arranged in a spatial arrangement relative to the first reference point in the first space extending parallel to the electrical line system and relative to a second reference point in a second space parallel to the electrical line system and wherein the currents flowing in the at least two main conductors and the at least one auxiliary conductor are selected such that a vector sum of the magnetic field components emanating from the at least two main conductors and the at least one auxiliary conductor is substantially equal to zero at the first and second references points.

The single conductors are arranged about the unsplit conductor so as to be substantially positioned on a circle.

The at least one magnetically compensated line system unit is a cable with insulation cover.

The cable carries single-phase current and comprises one of the split conductors and one of the unsplit conductors, wherein the single conductors and the unsplit conductor are each individually insulated and wherein the single conductors symmetrically surround the unsplit conductor.

Preferably, the electrical line system further comprises a neutral conductor, wherein the single conductors are arranged about the neutral conductor so as to be substantially positioned on a circle. Advantageously, a neutral conductor split into single neutral conductors is also provided, wherein the single neutral conductors surround the single conductors of the main conductors so as to be substantially positioned on a circle in order to shield against the formation of an external electrical field. A ground conductor arranged centrally with respect to the single conductors of the main conductors and the single neutral conductors may also be provided.

Alternatively, a ground conductor split into single ground conductors may be provided, wherein the single ground conductors surround the single conductors of the main conductors in order to shield against the formation of an external electrical field.

The cable may be designed to carry polyphase current and in this embodiment comprises one of the split conductors for each phase of the polyphase current, wherein each one of the single conductors is insulated, and wherein all of the single conductors are substantially positioned on a circle. Expediently, a neutral conductor is provided, wherein the single conductors are arranged about the neutral conductor so as to be substantially positioned on a circle. The neutral conductor may be split into single neutral conductors, and in this embodiment the single neutral conductors preferably surround the single conductors so as to be substantially positioned on a circle in order to shield against the formation of an external electrical field.

A ground conductor may be arranged centrally with respect to the single conductors and the single neutral conductors. In an alternative embodiment, the ground conductor is split into single ground conductors, wherein the single ground conductors surround the single conductors in order to shield against the formation of an external electrical field.

Advantageously, the cable has free ends and each one of the free ends comprises a connection device in the form of a plug. An electrical connection of the single conductors of each one of the split conductors is provided in each one of the connection devices. The electrical line system may further comprise a counter member for each one of the connection devices, and the counter members and the connection devices are embodied such that the connection device can be inserted into the counter member only in one position in which a neutral conductor of the connection device contacts a neutral conductor of the counter member.

In yet another embodiment of the present invention, the cable is configured as a twin lead and the single conductors are slightly offset relative to a plane defined by the twin lead in which plane the unsplit conductor is positioned.

When the cable carries polyphase current, the single conductors are preferably arranged in two planes that are essentially parallel to one another.

In another embodiment of the invention, the at least one magnetically compensated line system unit is an earth cable unit for transmitting high voltage current and the single conductors are in the form of separated conductors.

The at least one magnetically compensated line system unit is a railway traction current system having a railway traction current line wherein a first one of the main conductors is selected from the group consisting of an overhead contact line and a lateral contact line and wherein a second one of the main conductors is in the form of a track. One of the first and second main conductors functions as the split conductor. The split conductor is formed by providing a separate conductor in addition to the respective main conductors.

In a preferred embodiment of the invention, the track functions as the split conductor and is comprised of two of the single conductors, with a first one of the single conductors being the railway track proper and with a second one of the single conductors being a separate conductor, wherein the separate conductor is arranged such as a function of the current flowing therethrough that a compensation of the magnetic field components takes place in the first space. Preferably, the separate conductor extends underground and parallel to the track. Advantageously, a transformer for supplying a compensation current is provided and the single conductors of the split conductor each have a first and a second end and are connected to one another with the first ends, wherein the transformer is connected to the second ends.

In an other embodiment, a plurality of transformers for supplying a compensation current is provided, wherein each one of the transformers is connected between ends of two of the single conductors of the split conductor.

The separate conductor is divided into short conductor sections and the electrical line system further comprises a sensor device, wherein the sensor device determines in which one of the short conductor sections current is flowing, and switching elements positioned between neighboring ones of the short conductor sections. The switching elements supply compensation current only to those ones of the short conductor sections corresponding to portions of the first and second main conductors carrying current.

The sensor device is preferably a magnetic field sensor.

In yet another embodiment of the present invention, a plurality of the separate conductors are provided substantially in parallel to the railway traction current line.

Preferably, the single conductor has a cross-sectional area that is smaller than a cross-sectional area of the unsplit conductor. Advantageously, the sum of the cross-sectional areas of the single conductors is substantially identical to the cross-sectional area of the unsplit conductor.

The single conductors of each one of the split conductors expediently have the same identification markings, preferably in the form of a color code.

In accordance with the present invention, an electrical line system (primary system) is configured with at least two conductors for the transmission of electrical energy, in such a manner that a minimum of one additional line system (secondary system) is provided which runs at least approximately in parallel to the conductors of the (primary) system, that a power supply is provided for this line system with a current which is phase-synchronized in relation to the current in the original line system, and that the spatial arrangement of at least this one additional line system and the current flowing as a result of the power supply are selected so that magnetic fields caused by the currents in the individual conductors of the line systems compensate one another to an almost complete degree in an area of space running approximately in parallel to the line systems and which at least approaches a magnetic field-free condition.

In this arrangement, the configuration can be such that the line systems share one conductor in such a way that a conductor which is split into at least two single conductors, and an unsplit conductor are provided, and that geometrical position of the single conductors is arranged dependent on the currents flowing in the conductors, in such a way that the magnetic field of the current caused by the transmitted energy in the unsplit conductor is at least approximately compensated by the magnetic fields of the currents in the single conductors in the area of space running approximately in parallel to the line system. Splitting of a conductor can also be effected in more than two single conductors. This makes additional freedom possible in the geometrical arrangement of the entire line, which can represent an advantage in individual cases.

If the currents in the single conductors are in in-phase condition, it is advisable to locate these on opposite sides of the surface defined by the longitudinal extension of the unsplit conductor and a point lying in the compensation zone. It is also advantageous if this arrangement also means the ends of the single conductors of the individual split conductor are short-circuited to one another.

Furthermore, it is also beneficial if the single conductors possess at least practically the same electrical resistance and are located at symmetrical angles to the surface defined by the longitudinal extension of the unsplit conductor and a point lying in the compensation zone.

If the currents in the single conductors are in phase opposition, it is advisable to locate these on one side of the surface defined by the longitudinal extension of the unsplit conductor and a point lying in the compensation zone.

An embodiment in which a current source is connected between single conductors of the split conductor and the current source is phase-synchronized with the electrical energy transmitted in the line system can also be advantageous. It would be suitable for the current source to operate with impressed current, in other words with a high level of internal resistance in comparison to the circuit formed by the single conductors.

In the case of several (primary) line systems which run at least approximately in parallel and which have an effect on the area of space, it is advisable for a configuration to be provided which compensates the magnetic fields in only a part of these line systems, and for line systems configured to provide this compensation, to provide a mechanism for the spatial displacement of the conductors which enables at least partial compensation also to be effected in the case of magnetic fields of the other (primary) line systems.

In certain cases, it is beneficial if the single conductor or single conductors of the individual split conductors are located in at least practically symmetrical circles, or in a preferred embodiment in fully symmetrical circles, around the unsplit conductor. This arrangement is of most interest in the case of configuration as a single phase cable with insulating cover. In such a situation, it is advantageous to configure one of the two conductors provided for current transmission as a split conductor with its single conductors individually insulated in the same manner as the unsplit conductor, and to arrange the single conductors of the split conductor so they symmetrically enclose the unsplit conductor between them.

The cable ends can be provided with connection devices of prior art. The electrical connection of the single conductors of each of the split conductors is provided in the connection device on each cable end. In one example, the connection device can take the form of the terminal connector strip of a piece of electrical equipment. The connection device can be a plug on at least one of the ends of the cable. If the cable is equipped with a plug on one end and an in-series adapter on the other, the cable can be used as a device of prior art referred to as an extension cable. This is particularly advantageous, for example, in a situation such as when the current line running inside a bedroom wall to provide illumination at the bedside cabinet is located in the area of the bedhead. The bedside lighting connection can then be brought from a current socket through such an extension cable which is not routed through the bedhead area. Thus, to a considerable extent, the extension cable removes magnetic fields from the bedhead area, and in a corresponding configuration in accordance with a further development of the invention, can rid areas of electrical fields. In such an arrangement, it is advantageous if each individual plug and its mating part are configured in accordance with prior art in such a manner that the plug can only be inserted into its mating part if it is positioned so that the neutral conductor connection of the plug is in contact with the neutral conductor bushing of the mating part. This ensures that not only the magnetic fields, but also the electrical fields can be reduced to a negligible amount in the area of space in which compensation is to be effected in the required manner.

In the case of a cable for polyphase current with insulating cover, it is beneficial if each of the conductors assigned to one current phase is configured as a split conductor with its individual insulated single conductors, and if the single conductors of the split conductor are located in at least practically symmetrical circles, and in the case of an additional neutral conductor (zero conductor) being provided, if they are located, in a preferred embodiment, in symmetrical circles around the neutral conductor.

Furthermore, it is advantageous if the neutral conductor is also configured as a split conductor, and if its single conductors surround the circular arrangement of single conductors in the conductors which are each allocated to one current phase, in such a manner as to provide screening against the formation of an external electrical field.

The ground conductor can also be configured as a split conductor, and its single conductors can surround the other conductors in the cable in such a manner as to provide screening against the formation of an external electrical field.

The invention can also be beneficially used in a cable which is configured as a twin lead. In this arrangement, it is advantageous if the single conductors are located on two planes which are at least approximately in parallel to each other, and in the case of a polyphase system, if all conductors are split into single conductors. These different versions can also be used in the current supply lines of current paths and in current paths in consumers which possess a multi-planar layout with at least a degree of similarity from plane to plane.

In the case of the line system being configured as an earth cable suitable for transmitting high-voltages, it is advantageous to provide the single conductors as separated conductors.

The invention is also particularly important in the case of railway traction current systems. In such systems of prior art, the track functions as one conductor and an overhead contact line (German Federal Railways) or a lateral contact line (German "U-Bahn" or underground railway systems) is used as the other conductor of a two conductor system which usually operates with an operating voltage of 15 kilovolt and operating currents of 100 Amps and more. In accordance with the present invention, one of the two conductors mentioned above is supplemented to make a split conductor. It is advantageous if the track is supplemented by at least one single conductor to make the split conductor, and if the spatial arrangement of the single conductor is selected in relation to current flowing through it, in such a manner that compensation is effected in the area of space referred to.

In one embodiment, the single conductors are connected together at one of their ends, and the other ends of the single conductors are connected to a transformer which supplies the compensation current.

In a further embodiment, a transformer which supplies the compensation current is connected at each end of the single conductors between single conductors. In a railway traction current system configured in accordance with the present invention, it is advantageous if the single conductor which supplements the one conductor to make it a split conductor is divided into short single conductor sections and if a sensor device is provided which determines which line section formed by an overhead contact line or a lateral contact line and track has current flowing in it. Switching equipment shall be provided at the transition points from one single conductor section to the next, such that the switching equipment only supplies compensation current to those single conductor sections in which current is flowing in the overhead or the lateral contact line. In this manner, due account can be taken of the situation that compensation is only effected for the magnetic field which projects outwards in those railway traction current sections which lie between the incoming feeder point in the railway traction current circuit and the railway traction current section in which an electric locomotive is located, and no other railway traction current line sections can be loaded by a magnetic field as a result of the compensation field. In order to determine the condition referred to, it is advantageous if a magnetic field sensor is provided as the sensor device, for example a coil which corresponds to the railway alternating current frequency of 16⅔ Hertz. In the case of direct current operation, a Hall probe, for example, can be used in accordance with prior art, which modifies its electrical resistance value in the presence of a d.c. magnetic field and the resistance modification can be employed as a switching criterion.

It is also worthy of mention that more than one single conductor can be provided and be routed at least approximately in parallel to the railway traction current line. As in the other cases, several single conductors can be provided.

In many practical applications for the present invention, it is a considerable advantage if, in a preferred embodiment, the cross-sectional area of the single conductors can in each case be considerably smaller in comparison to the unsplit conductors, in particular in such a manner that the total cross-sectional area of the single conductors at least approaches the cross-sectional area of the unsplit conductor. On the one hand, this means that neither the size of the conductor material nor the cable cross-section are increased unnecessarily, whilst on the other hand, progress is made towards achieving the degree of flexibility required in particular for cables with regard to their bending properties In order to guarantee the correct allocation of single conductors to connections which continue the circuit, such as a connection device, it is advantageous if the single conductors, each of which forms a split conductor, are provided with the same marking, in particular as concerns the coloring of their insulation. Even a differentiation method which relies on shape, such as the differentiated corrugation of loudspeaker connection cables used in stereo systems, can be used to beneficial effect.

BRIEF DESCRIPTION OF THE DRAWINGS

In the text below, the present invention is explained in greater detail with the help of sample configurations illustrated in the drawings.

In the drawings.

DESCRIPTION OF PREFERRED EMBODIMENTS

Figure 1:
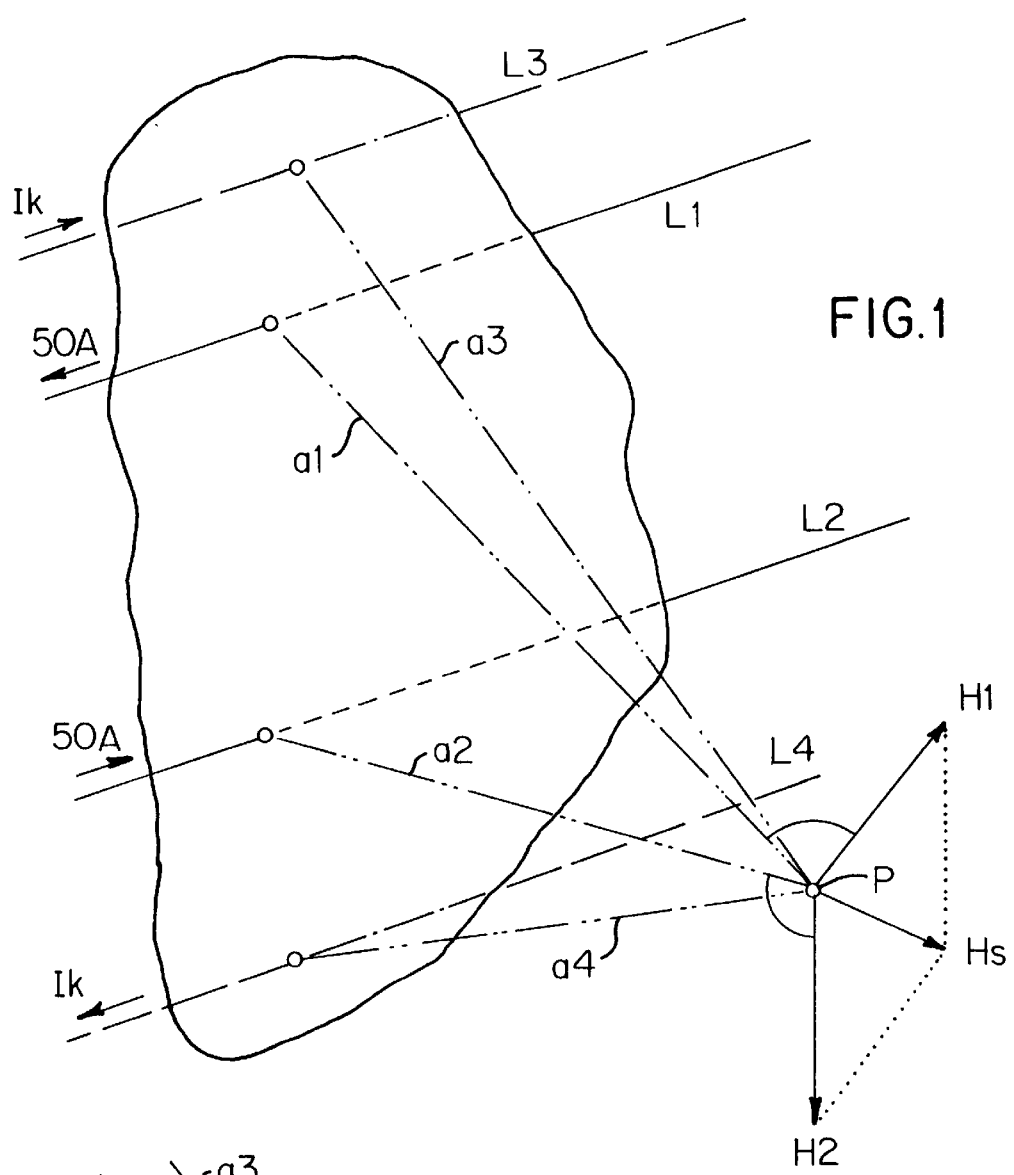
FIG. 1 shows the spatial representation of a line system, which is used to explain in more detail the method by which the present invention operates.

FIG. 1 shows a cross-sectional view through a line system, by means of which the compensation is explained in greater detail.

Conductors L1 and L2 represent the outward or return conductor of a single phase two-wire line for transmitting electrical energy of 11.5 kW at a frequency of 50 Hertz and voltage of 230 Volt. This means that each of the two conductors carries a current of approximately 50 Amps. The distance between the two conductors is approximately 0.5 m. Such a situation arises for example in the current supply to a house through an arrangement referred to as a service entry mast line. This gives rise to two magnetic field components H1 and H2 at a distant reference point P, whereby these components are caused by the current in the outward and return conductor. Both the magnetic field components are in phase opposition, but are not in the same alignment due to the distance between the conductors. Their sum is dependent on the distances (a1, a2) between the reference point P and each conductor (L1 or L2) in the cross-sectional plane Q. A sum component Hs is created in accordance with prior art, and Hs is not equal to zero.

Figure 2:
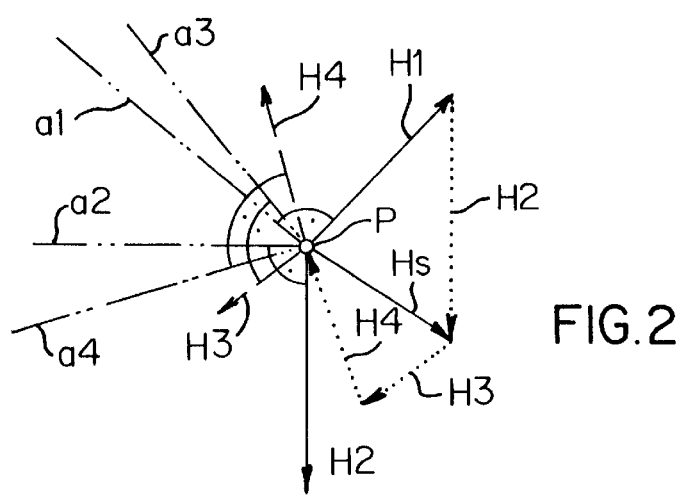
FIG. 2 shows a vector diagram of the system in accordance with FIG. 1.

If an additional two-wire system with conductors L3 and L4 is added, as shown in FIG. 1, and if a current which is phase-synchronized to line system L1, L2 is allowed to flow, additional magnetic field components H3 and H4 are created, with the alignment of these magnetic field components being dependent on the position of conductors L3, L4 in the cross-sectional plane and the magnitude of the magnetic field components being dependent on the current flowing within them as well as on the respective distances a3, a4 from point P. If the phase selection is correct (in example H2 and H4 and H3 and H1, each in phase opposition), a vector diagram in accordance with FIG. 2 will result.

Phase-synchronized condition is understood to mean that the currents in the conductors under consideration are not only of the same frequency and have the same amplitude sequence over time, but are also phase-locked in relation to each other, and depending on the application, are in phase or in phase opposition.

The sum components of the four magnetic field components H1, H2, H3 and H4 in the reference point P can be reduced to zero by displacing L3, L4 and selecting the current IK in L3, L4.

In practical cases, conductor L2 can be combined with conductor L4 to make one conductor.

The current in the second line system can be generated in various ways. One method is to split the original L2 conductor into two conductors and short-circuiting the two single conductors to the ends of the line system. The current in each of the single conductors is then practically determined by the relationship between the resistances of the two single conductors, whereby the relationship can preferably be realized by using lines of differing cross-sections.

Another method is to connect a current source either in the additional line system or, in the case referred to above where the conductor is split into two, to connect a current source between the two single conductors, whereby the current source, in a preferable embodiment, operates using impressed current and is phase-synchronized to the current flowing in the original line system. If the phase of the current flowing through this current source in conductor L2 is in phase opposition to the current which was originally flowing in L2, the current flowing in L2 is reduced to a level lower than the original current. Furthermore, this has a side effect that the line transmission losses in L2 for the primary line system are reduced. However, if in-phase condition prevails, the current in L2 is increased in relation to the original current.

The electrical energy required for magnetic field compensation in a line system in accordance with the present invention is negligible in comparison to the energy which is to be transmitted in the primary line system (L1, L2), because the source voltage which has to be applied is very small in comparison to the operating voltage between conductors L1 and L2.

Figure 3:
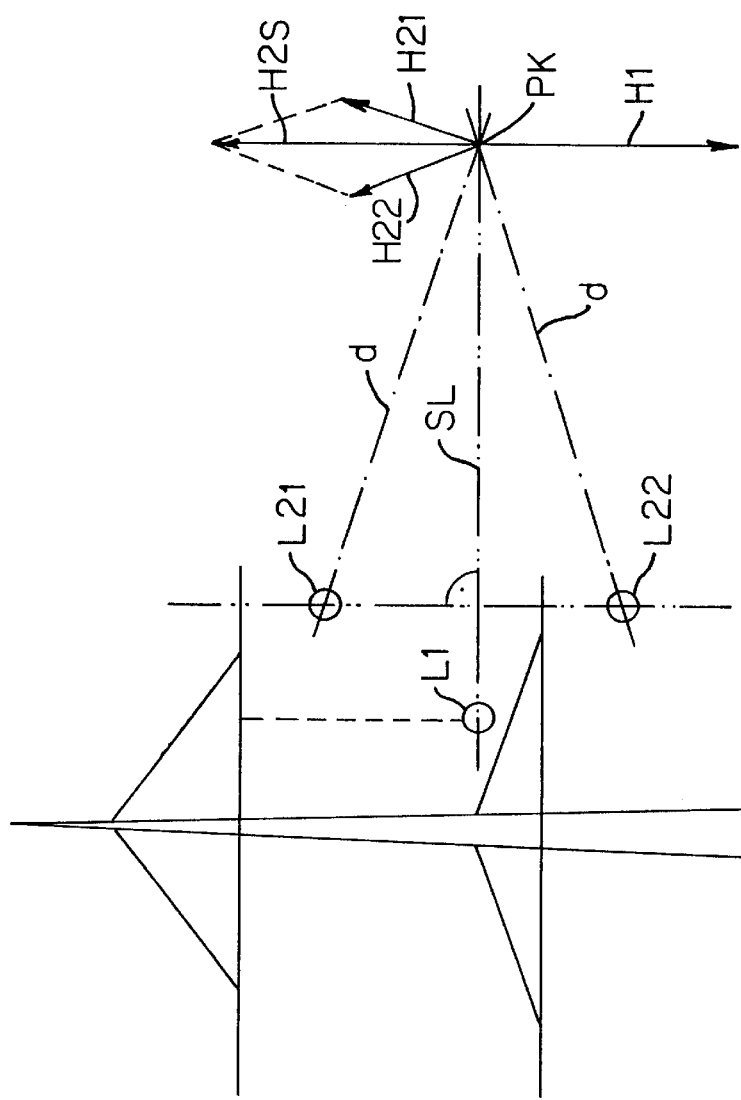
FIG. 3 shows a sectional view of a single phase high voltage system for railway traction current supply with, for example, 115 kV.

FIG. 3 shows a high-voltage line configured as a two-wire system with conductors L1, L2 in accordance with the present invention. In this case, conductor L2 is split into conductors L21 and L22. The routing of conductor L1 and a compensation point PK defined near the conductor route or a parallel to conductor L1 running through compensation point PK define a reference plane extending along the route which is specified in the cross-sectional view in accordance with FIG. 3 by a line of symmetry SL which touches points L1 and PK. The two conductors L21 and L22 resulting from the splitting of conductor L2 are located at symmetrical angles to the line of symmetry SL and far enough away from the compensation point PK that the vector sum H2S of both individual magnetic fields H21 and H22 in the compensation point PK has the value of the magnetic field vector H1 which is to be allocated to conductor L1 in the compensation point. In the example in FIG. 3, both individual magnetic fields H21 and H22 are located in fully symmetrical positions to the line of symmetry SL. If conductors L21 and L22 are carrying half the current of conductor L2 each, the amounts of the appropriate magnetic fields H21 and H22 are also the same, due to the distance d of conductors L21 and L22 from the compensation point PK also being the same. Conductors L21 and L22 are located at symmetrical angles to the line of symmetry SL, and so the combined vector H2S of magnetic fields H21 and H22 is a magnetic field vector H2S which has a directional axis of orientation identical to that of magnetic field vector H1. Outward and return currents in the single phase system give rise to magnetic fields H1 and H2 with opposite orientation in the compensation point PK (phase opposition). This means the magnetic fields compensate each other completely in the compensation point PK.

Figure 4:
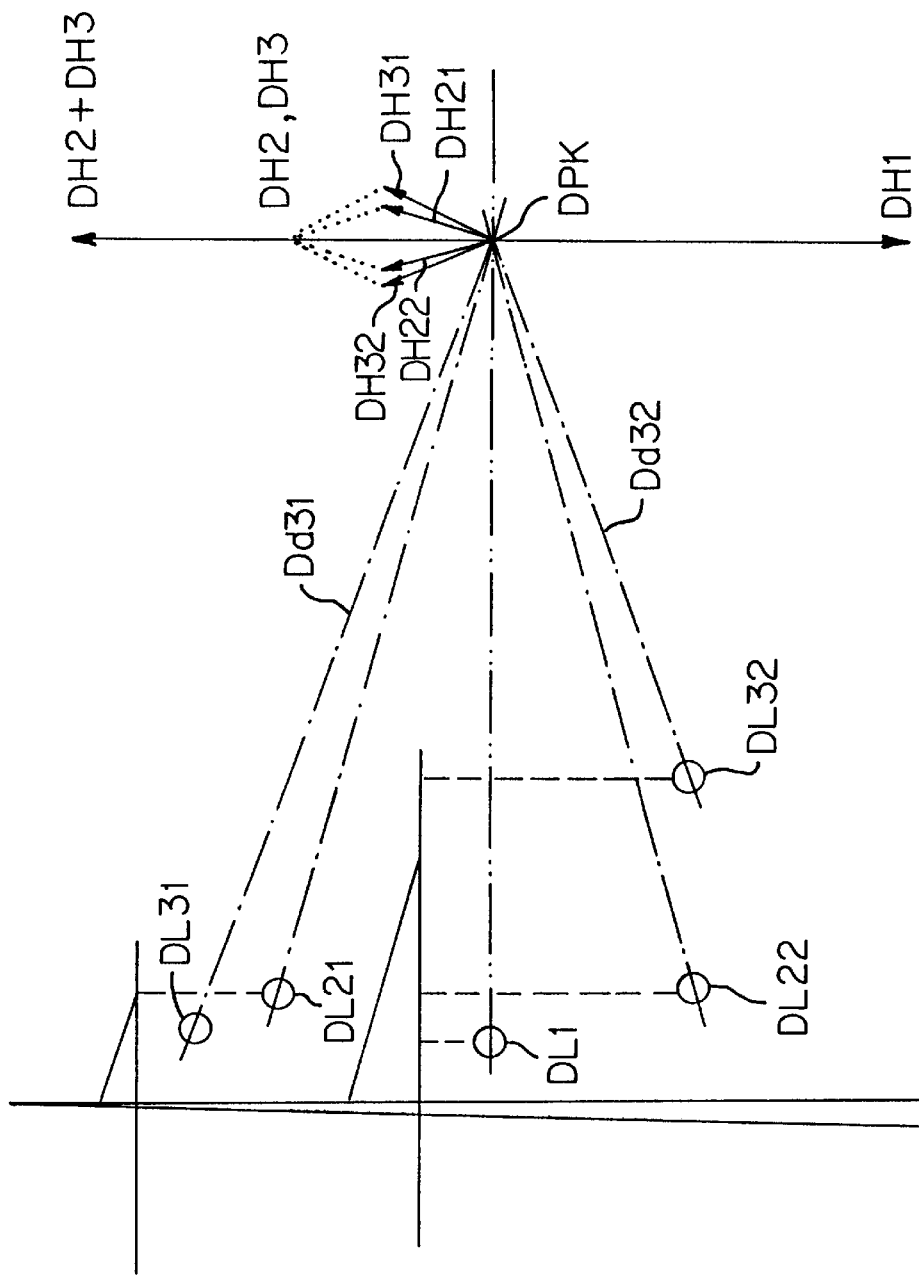
FIG. 4 shows a three-phase current system as employed as standard in the 115 kV range and above, however reconfigured in accordance with the present invention.

FIG. 4 shows a possible method of compensating the magnetic field generated in a three-phase system with conductors DL1, DL2 and DL3. The figure shows a cross-sectional view, and as in FIG. 3, the straight line through points DL1 and DPK represents the reference parameter for an arrangement of conductors with symmetrical angles. In this case, the single conductors DL21 and DL22 resulting from splitting conductor DL2 are in a fully symmetrical arrangement, similarly to the arrangement in FIG. 3. When at a corresponding distance from the compensation point DPK and with the corresponding phase, the combined vector DH2 to be allocated to these conductors has the same value as DH1 and also the same directional axis orientation as DH1. The conductor DI2 is assumed to be of identical size in both of the single conductors DL21 and DL22. Conductor DL3 is split into single conductors DL31 and DL32. The distances Dd31 and Dd32 between these two single conductors and the compensation point DPK and the currents DI31 and DI32 flowing in them are assumed to be of differing values. Currents DI31 and D132 are of sufficient magnitude that their corresponding magnetic field vectors DH31 and DH32 in the compensation point DPK are of the same amount when they have comparable phases, and their combined vector DH3 corresponds in value with that of DH1. As far as momentary observation is concerned, for example with maximum electrical conductor amplitude and fully symmetrical three-phase current operation, the values of the three magnetic fields DH1, DH2 and DH3 are identical. The entire arrangement is in angular symmetry, and so all three magnetic field vectors DH1, DH2 and DH3 share the same orientation, namely the orientation of DH1. It is a known fact that the sum of currents DI1, DI2 and DI3 in a three-phase conductor system is equal to zero at any time, and therefore this is also true for the sum of the individual magnetic field vectors in compensation point DPK. In the example shown in FIG. 4, the vectors indicated apply for that moment when DI1=−DI2/2 and DI1−DI3/2. Because the conductors determine the magnetic fields, this can be applied in the same way for the corresponding magnetic fields.

Figure 5:
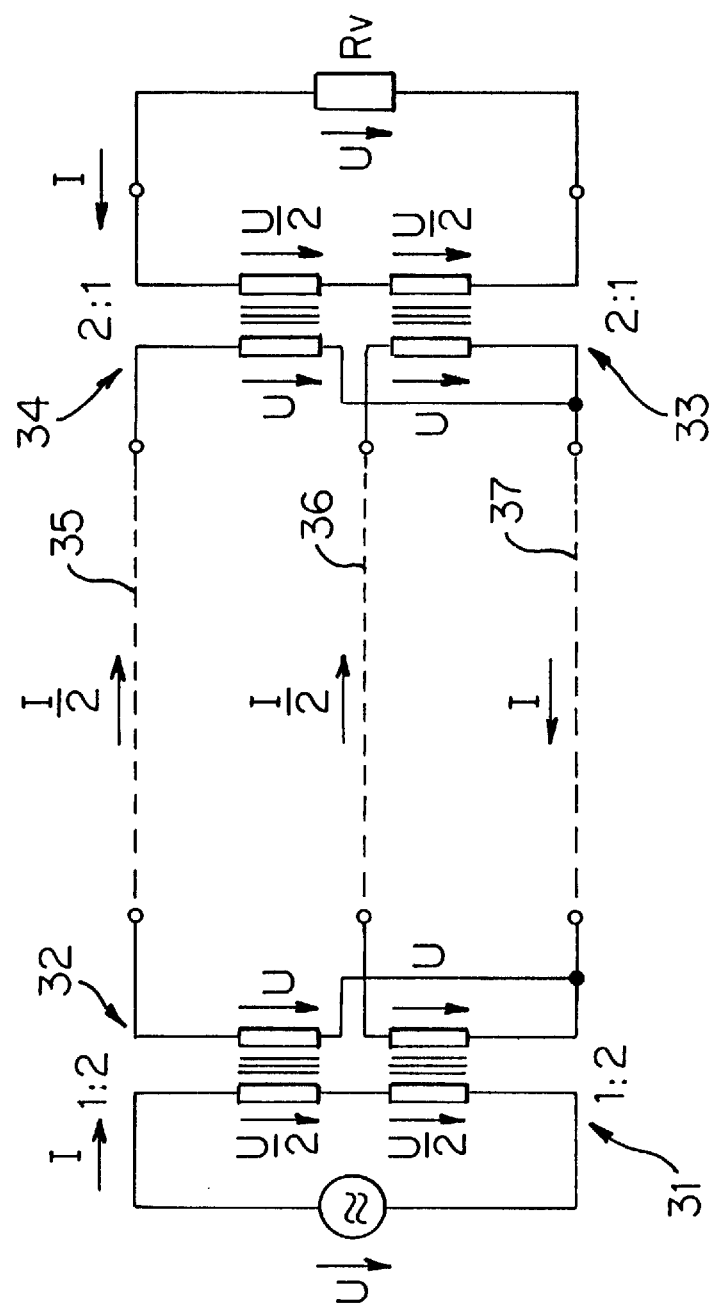
FIG. 5 shows a circuit diagram for the configuration of the transformer device in order to guarantee current splitting for the individual conductors.

It is to be taken as adequately self-evident that when a conductor is split into several current-carrying single conductors of identical proportions, the single conductor currents will be divided equally because the single conductors connected in parallel all have the same resistance value. FIG. 5 shows a circuit which presents one option for targeted external current distribution. The relationships between the transformation ratios of the four transformers 31, 32, 33 and 34 can be used for setting the distribution of conductor I between two single conductors 35 and 36. In the example, the distribution is effected in such a manner that half the current I flows in each conductor 35, 36 as flows in conductor 37 which is not split. In other words, the distribution is dependent on the supply voltage of each of the two single conductors.

Figure 6:
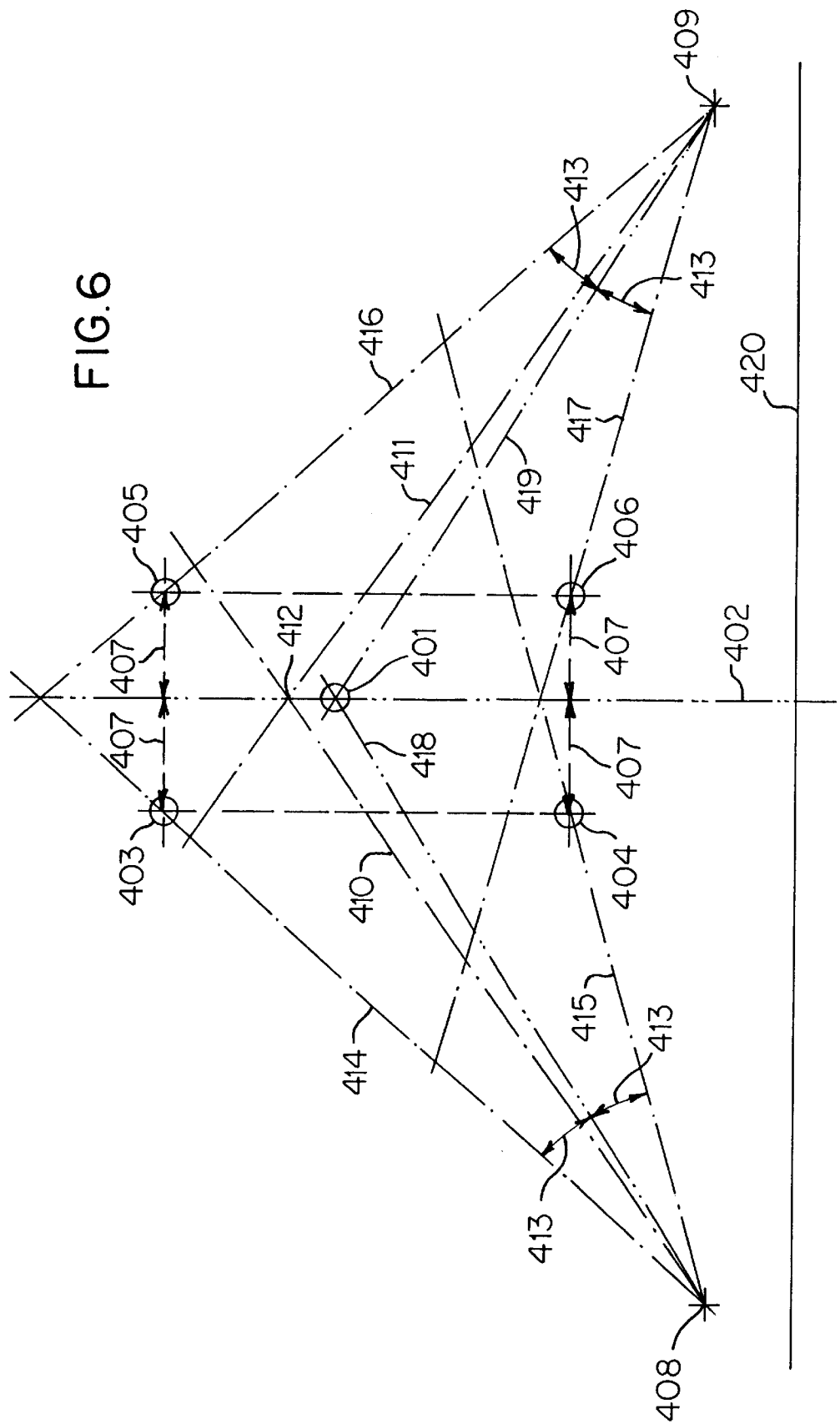
FIG. 6 shows a fully symmetrical single phase system in accordance with the present invention.

The arrangement shown in FIG. 3 only provides magnetic field compensation which is effective on one side in relation to the route of the high voltage line, however compensation can be effected on both sides. FIG. 6 shows a configuration for this which enables a compensation effective symmetrically to the route with a single phase system. A conductor 401 is located on the axis of symmetry 402 of the route, the second conductor is split into four single conductors 403, 404, 405 and 406 which are located symmetrically to and at the same distance 407 to the axis of symmetry 402. The two compensation points 408 and 409 are located at asymmetrical points on opposite sides of the route, and two axes of symmetry 410 and 411 proceeding from these compensation points 408 and 409 intersect at point 412 on the axis of symmetry 402. The four single conductors 403, 404, 405 and 406 and the compensation points 408 and 408 together form two pairs of straight lines 414, 415 and 416, 417, all of which form the same angle 413 to both the axes of symmetry 410 and 411. In the diagram, the surface of the ground is represented by 420. In order to achieve optimum magnetic field compensation symmetrically to the route in compensation points 408 and 409 with the single conductors arranged in this way, the unsplit conductor 401 has to be located slightly below the point of symmetry 412, and the currents in the four single conductors 403, 404, 405 and 406 taken as pairs 403, 405 and 404, 406 must be the same amount. The distribution of the total current which corresponds to the current in 401 is different in both single conductor pairs 403/405 and 404/406. In the example, this is 2:1. The split required is dependent on how far the unsplit conductor is located below the point of symmetry 412, and on how the other geometrical relationships are set. As in the case of the other configuration examples, the split can be determined using the vector diagram.

Figure 7:
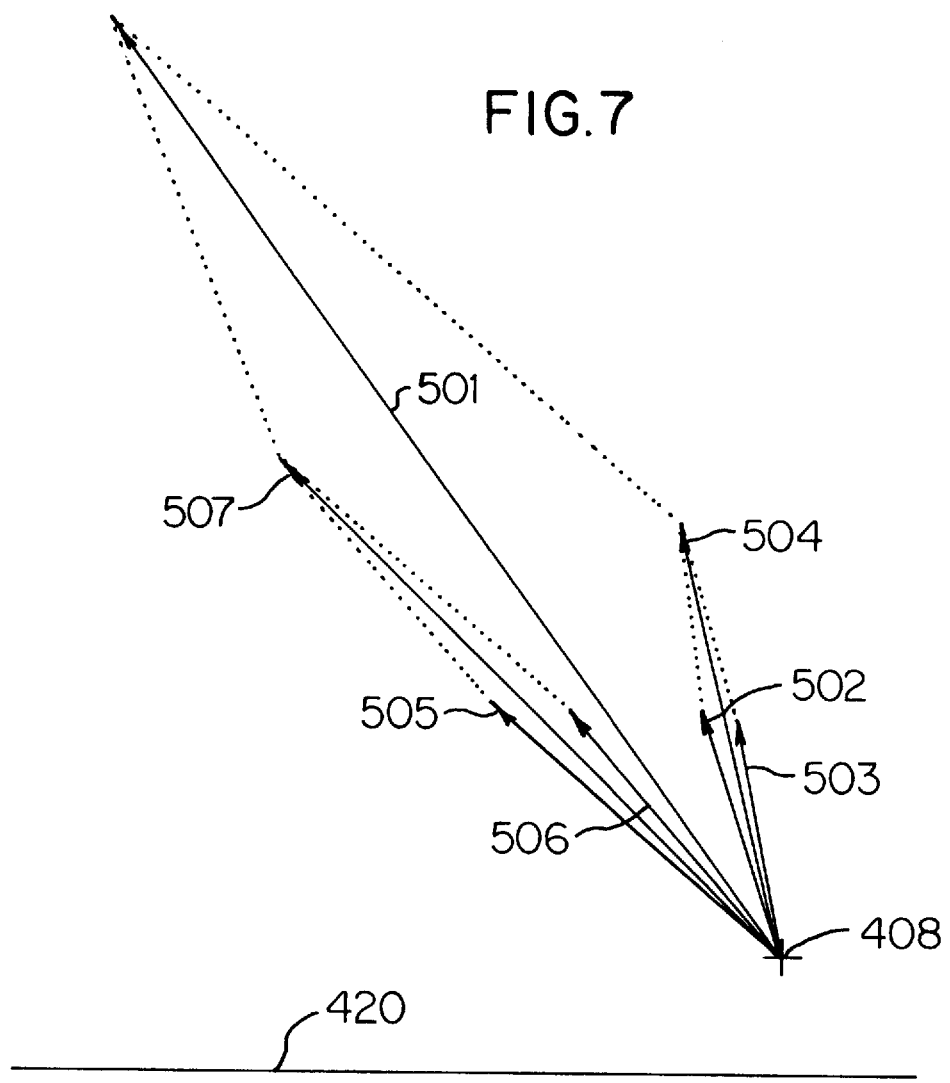
FIG. 7 shows the vector diagram of the magnetic field for a system in accordance with FIG. 4.

The sample arrangement shown in FIG. 6 results in a picture of the magnetic field vectors across the surface of the earth 420 for the compensation point 408, as is shown for a specific conductor current strength in a single phase system in accordance with FIG. 7. The conductor 401 which carries the entire current generates a magnetic field described by the vector 501 which gives its amount (length) and orientation in space (shown in phase opposition in the example), whereby the magnetic field depends on the strength of the current in conductor 410, its distance 419 from the compensation point 409 and its orientation in space(at right angles to 419). The magnetic field vectors 502 and 503 corresponding to conductors 403 and 405 are determined accordingly. If these vectors are added together, they produce the combined vector 504. In the case of conductors 404 and 406, the vectors are 505 and 506 or the combined vector 507. Vectors 504 and 507 are allocated to the single conductors 403, 404, 405 and 406; they are therefore in in-phase condition. The sum of their vectors represents the total magnetic field vector 501 of the entire current in the single conductors. In the phase conditions reduced to their fundamentals in the illustration, this magnetic field vector is practically of the same magnitude as the magnetic field vector of the current in conductor 401 which is in phase opposition. The directional axes are the same, and so both magnetic fields compensate one another. The exact values are dependent on the overall geometrical relationships and can be derived from the vector diagram as explained above.

Figure 8:
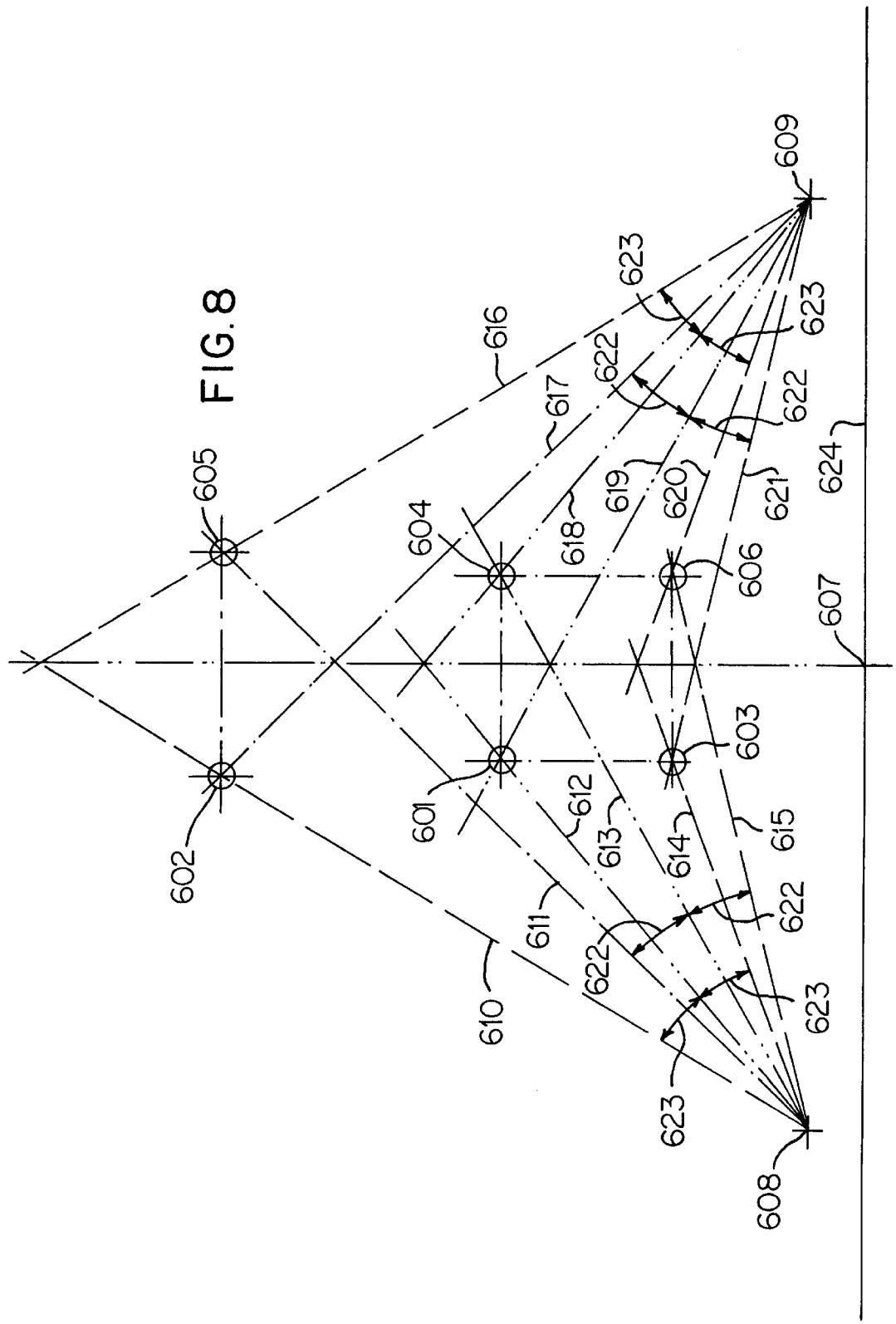
FIG. 8 shows two single phase, fully symmetrical systems in accordance with the present invention.

FIG. 8 shows one example of a magnetic field compensation arrangement which is fully symmetrical to the route, in the case of two two-phase systems 601, 602, 603 and 604, 605, 606 which each have one conductor split into two parts 602, 603 and 605, 606 above the surface of the earth 624. In this example, conductors 602/605, 601/604, 603/606 of the entire system are in pairs and located symmetrically to the main axis of symmetry 607. Straight lines through the two compensation points 608, 609 and the conductors 602, 601, 603 and 605, 604, 606 form two equal pairs of angles 622, 623 on each side.

The intersections of the straight lines 610 to 620 determined by the pairs of angles 622, 623 coincide with the position of the conductors. 610 and 617 intersect at 602. 611 and 616 intersect at 605. 612 and 619 intersect at 601. 613 and 618 intersect at 604. 614 and 621 intersect at 603. 615 and 620 intersect at 606.

Figure 9:
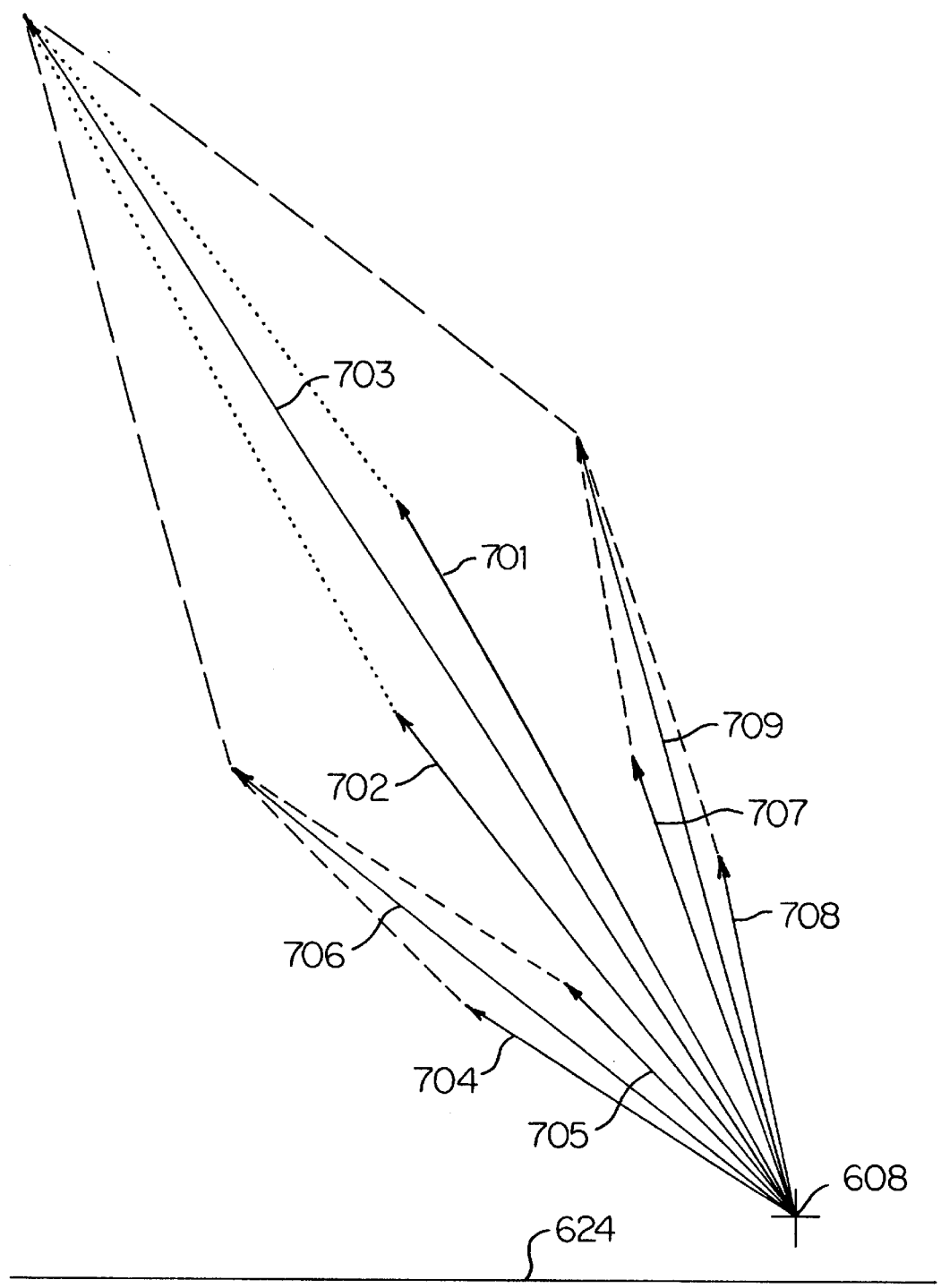
FIG. 9 shows the vector diagram of the magnetic field in a system in accordance with FIG. 8.

The example in FIG. 9 shows the magnetic field vector situation for compensation point 608, and correspondingly for compensation point 609 as well, which results from a fully symmetrical arrangement of conductors. Vectors 701 and 702 and their combined vector 703 belong to the two unsplit conductor currents 601, 604 (the three vectors are entered in FIG. 9 in phase opposition). Vectors 704 and 705 and their combined vector 706 belong to the split conductor currents 602 and 605 and vectors 707 and 708 and their combined vector 709 belong to the split conductor currents 603 and 606. These vectors produce the overall magnetic field vector 703 for the total current which, in the split conductors 602, 603, 605, 606 and as reverse current, is identical with the current in the unsplit conductors 601, 604. Both total currents therefore have the same amounts and the same directional axes in the compensation point 608. The situation is fully compensated because both the currents or magnetic fields are in phase opposition.

Figure 10:
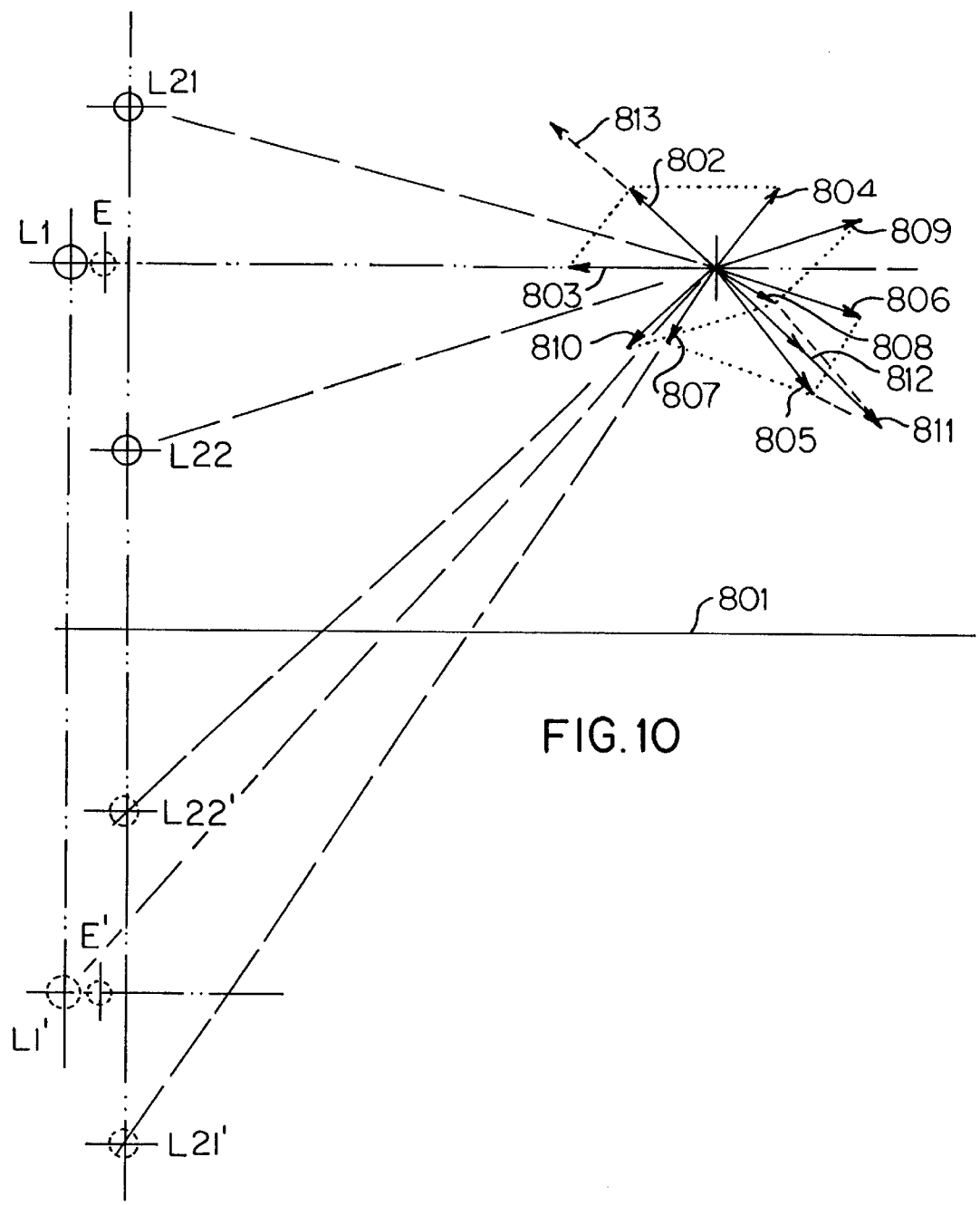
FIG. 10 shows a view in accordance with FIG. 3, however with an additional feature for effecting compensation for the electrical field.

FIG. 10 illustrates the possibility of additionally compensating the electrical field whist compensating the magnetic field. An additional electrical conductor E is used here as a supplement to the magnetic field compensation at point PK for a two-phase current system L1, L2 with split conductors L21 and L2 illustrated in FIG. 3, whereby the additional electrical conductor has an identical voltage potential to that of conductor L1, but does not conduct any current. This means the magnetic field compensation is not disturbed by this measure. FIG. 10 therefore simply includes the vectors which describe the electrical field. The graphical orientation of these vectors is effected in accordance with the familiar procedure of mirroring the conductors with potential to earth against the surface of the earth 801. This results in the mirror points L1', L21', L22' and E' which are in each case to be assigned phase opposition. The individual vectors of the electrical field are determined by the level of the potential, the distance between the conductors and the compensation point PK and the directional orientation described by the straight line connections between conductors L1, L21, L22, E, L1', L21', L22', E' and the compensation point PK.

Conductor L1 creates an electrical field described by the vector 802 which can be derived from the vector sum of the vectors 803 and 804 (phase opposition) which are determined by conductors L1 and L1'. In accordance with this, the vector 805 is allocated to conductor L21 whereby vector 805 is defined by the sum of vectors 806 (L21) and 807 (L22'), and in the same way, vector 808 is allocated to conductor L22 and vector 808 is made up of vectors 809 (L22) and 810 (L22'). The sum of vectors 805 (L21) and 808 (L22) gives a vector 811 (L21 and L22) which already goes some way towards compensating vector 802 (L1). The remaining electrical field is described by vector 812. The inclusion of the non-current carrying conductor E, whose potential corresponds to that of conductor L1, results in a vector for the electrical fields which approximately corresponds to vector 802 which is dependent on L1. Given an opposite direction of orientation, the resulting vector sum 813 corresponds to the value of vector 811, and this gives a very good compensation of the electrical field at the compensation point PK. In this example, a further development of the present invention can have conductor E included in the current load of conductor L1 in order, for instance, to reduce any ohmic losses.

Figure 11:
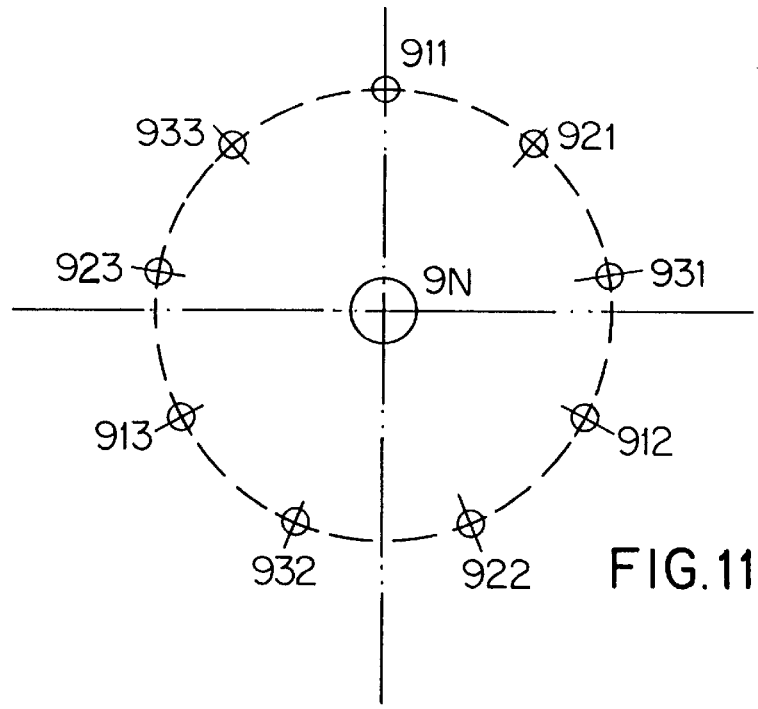
FIG. 11 shows a sectional view of a cable for transmitting three-phase current in a star connection, e.g. with a neutral conductor, however without a ground conductor (also referred to as PE in standardized technical terminology)

The cross-sectional view illustrated in FIG. 11 shows an electrical line system in accordance with the present invention as cables for transmitting electrical energy in multiple phases. In a three-phase current system, the three phase conductors 91, 92, 93 are for example each divided into three single conductors 911, 912, 913; 921, 922, 923; 931, 932, 933 which are arranged in alternating symmetrical circles around the central neutral conductor 9N. In this arrangement, the weakness and the regularity of prevention of the disruptive magnetic field outside the cable is in direct proportion to the number of split conductors included in the arrangement.

The line system transmits the entire outward and return current, and therefore the sum of all the currents is zero. All currents which are flowing are broadly distributed in symmetrical circles as far as their cross-section is concerned because of the split phase conductors and because of the centrally arranged neutral conductor, and so the magnetic field is optimally compensated outside the cable. It is advisable to dimension the total cross-sectional area of the single conductors of a split conductor in accordance with the size required by the whole unsplit conductor.

Figure 12:
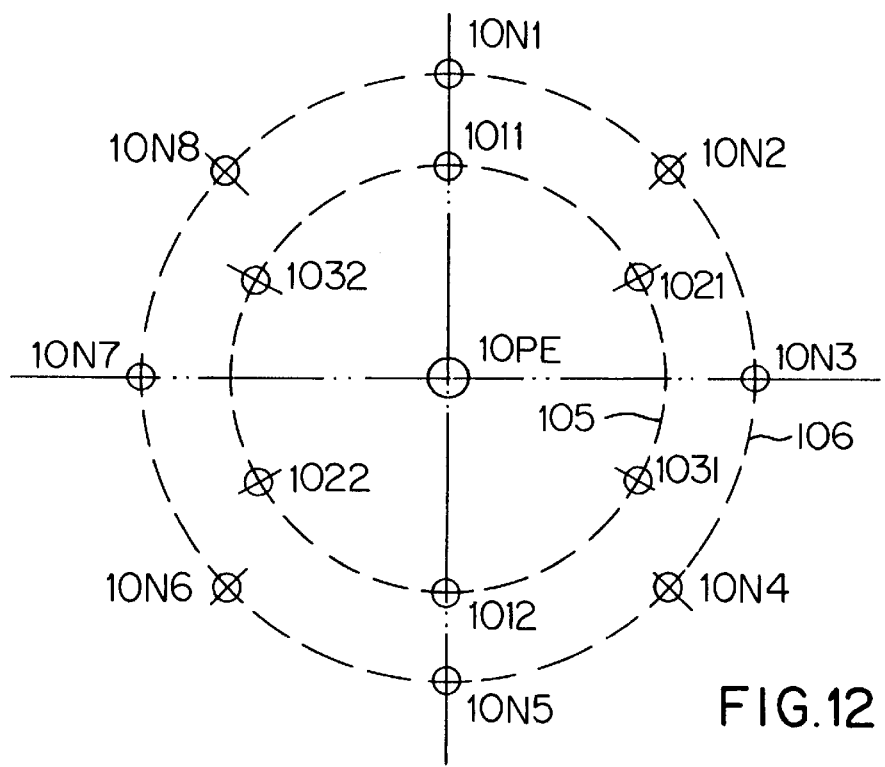
FIG. 12 shows a cable in accordance with FIG. 11, however with a PE.

The electrical line system arranged in accordance with the present invention, as illustrated for example in FIG. 11, can also be used to prevent electrical fields arising outside the cable in accordance with the cross-sectional arrangement shown in FIG. 12. The three phase conductors for a three-phase current system 101, 102, 103 are each split into two single conductors 1011, 1012: 1021, 1022; 1031, 1032 and are distributed in an arrangement of even symmetrical circles (circle 105). The eight split single conductors 10N1 to 10N8 of neutral conductor 10N are located on a correspondingly larger circle 106. If a ground conductor 10PE is used, it is located centrally.

Figure 13:
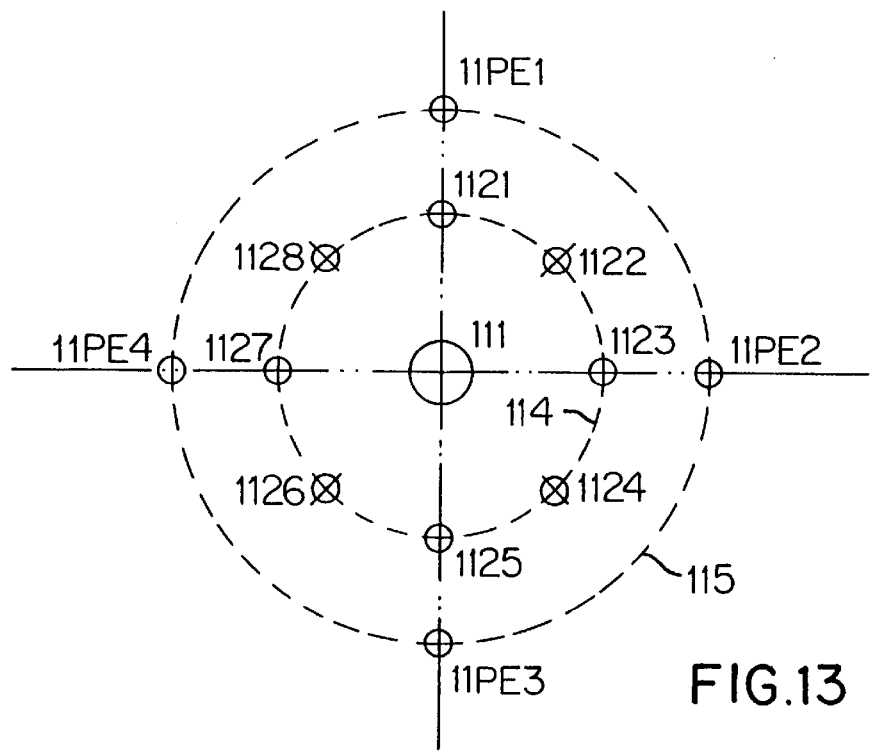
FIG. 13 shows a single phase cable, as could be used for example as an extension cable in a low-voltage system (230 V)

The cross-sectional drawing in FIG. 13 shows a further embodiment of an electrical line system as a cable, in accordance with the present invention. In a two conductor system with both conductors 111 and 112, conductor 112 is split into eight single conductors 1121 to 1128 which are arranged in a symmetrical circle (circle 114) around conductor 111 which is located in the center. The large number of single conductors 1121 to 1128 means that practically no fields are generated outside the cable. This therefore guarantees good magnetic field compensation no matter what the polarity of, for example, a plug inserted in a socket happens to be. In order to prevent an electrical field extending beyond the cable, it is sensible to have the ground conductor 11PE which is split into four single conductors 11PE1 to 11PE4 as the outermost layer of the loop (circle 115) and use it as a shielding mechanism at the same time.

To give optimum compensation of the magnetic field existing outside a cable, it is necessary that the opposing fields generated by the outward and return currents should be of the same magnitude and should have the same phase conditions and be distributed as evenly as possible at every point in the surrounding space, as is guaranteed if the outward and return currents are identical. It is also necessary for the spatial orientation of the mutually compensating fields to be in concordance if the compensation is to be practically total. This situation is only guaranteed if all current-carrying conductors are routed in parallel. If this should not be possible due to technical reasons associated with the manufacture of cables, for example due to different conductor twisting, this can be achieved in accordance with the present invention with split conductors in which due to contradirectional twisting of the split conductors the resulting vector of the magnetic field as assigned to each current path adopts a ninety degree alignment to the axis of the cable, thus fulfilling the requirement that the field vectors should be of the same value. In accordance with the present invention, in order to obtain a distribution of current in symmetrical circles which is as evenly spread as possible over the cross-section of the cable, it is advisable to twist the split conductors contradirectionally in pairs.

Figure 14:
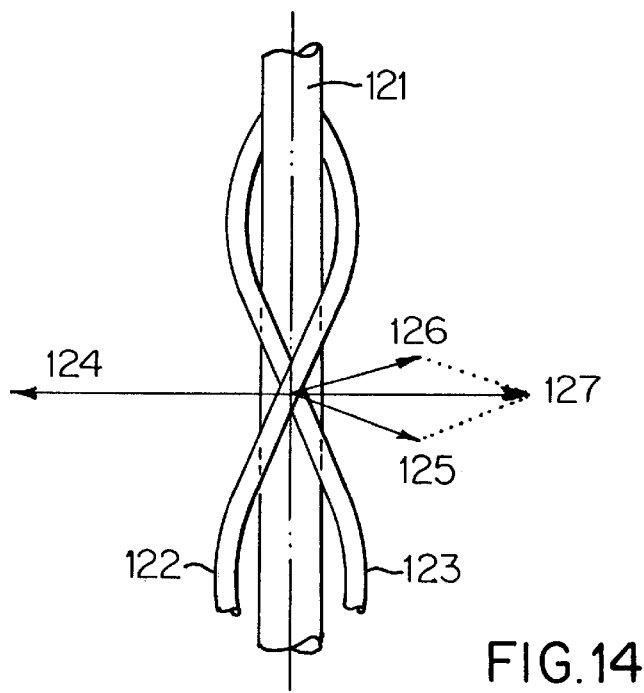
FIG. 14 shows a single phase cable, for example in accordance with FIG. 11, however with compensation of the magnetic field resulting from twisting the single conductors of cables as normally performed for reasons of flexibility.

FIG. 14 shows a cable for two current paths (outward and return current) in which one conductor 121 split into two insulated single conductors 122, 123 is fitted centrally, surrounded by two conductors. Conductor 122 has a right-hand twist, and accordingly, conductor 123 has a left-hand twist. The current in conductor 121 generates the magnetic field described by vector 124; vector 125 applies to conductor 122 and vector 126 applies to conductor 123. Vectors 125 and 126 combine to produce the combined vector 127. For reasons of symmetry, this vector 127 is at a right angle to the axis of the cable and so shares the same orientation as vector 124. As a result of the phase opposition, this means the two magnetic fields compensate each other no matter what the direction is, except for the difference in the magnitudes.

Figure 15:
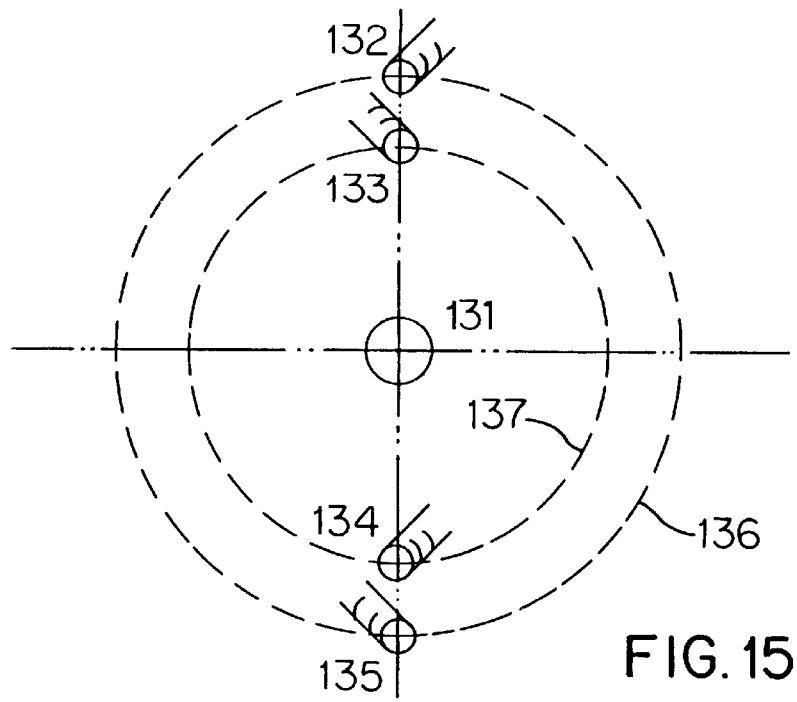
FIG. 15 shows a cable in accordance with FIG. 14, however with PE.
Figure 16:
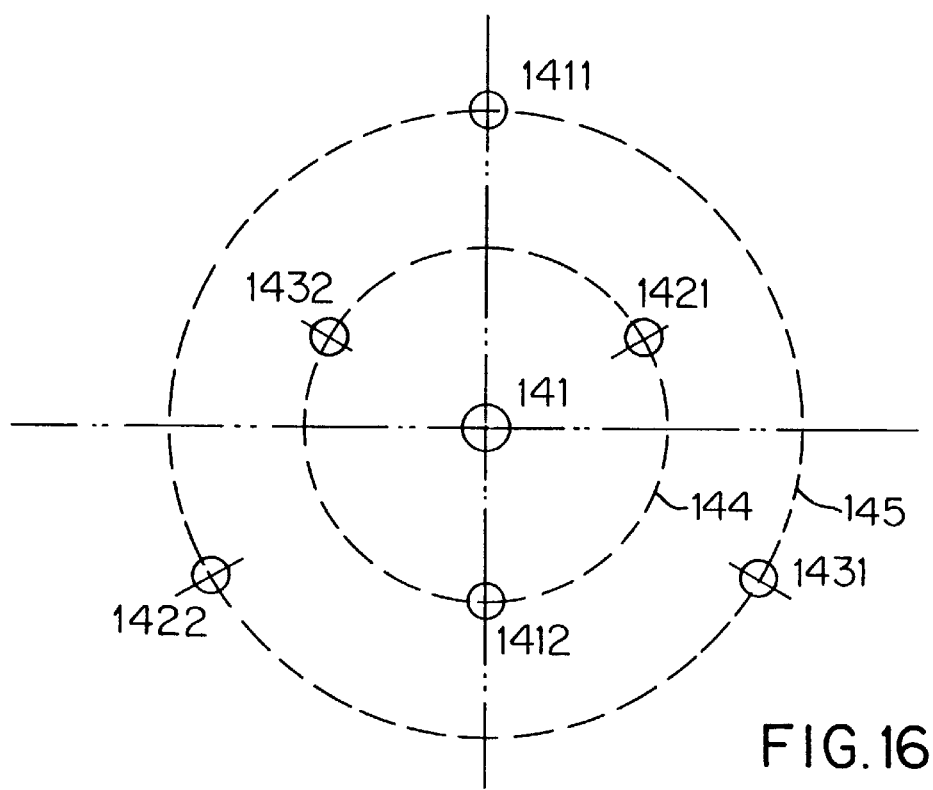
FIG. 16 shows a cable for transmitting three-phase current in three phases in a delta circuit with contradirectional twisting of the single conductors to give additional magnetic field compensation.

FIG. 15 shows an arrangement with a PE or ground conductor 131 and two split conductors 132, 133 and 134, 135. Conductors 132, 135 in the outer cross-sectional circle have a right-hand twist and the conductors in the inner cross-sectional circle 137 have left-hand twist. The opposing direction of twist of both current-carrying conductors 132 and 133, 134 and 135 means that the values and directional orientations of the magnetic fields equalize one another more effectively. FIG. 16 shows a corresponding arrangement for three-phase current (delta operation). In the center, this incorporates a protective earth (PE) 141 and conductors for each phase 1411,1412; 1421,1422; 1431,1432 which are split into two single conductors and are distributed in symmetrical circles evenly around an inner circle (defined by 1412, 1421, 1432) and an outer circle (defined by 1411, 1431, 1422). The single conductors of the inner circle 144 all have a left-hand twist and those of the outer circle 145 all have a right-hand twist.

Figure 17:
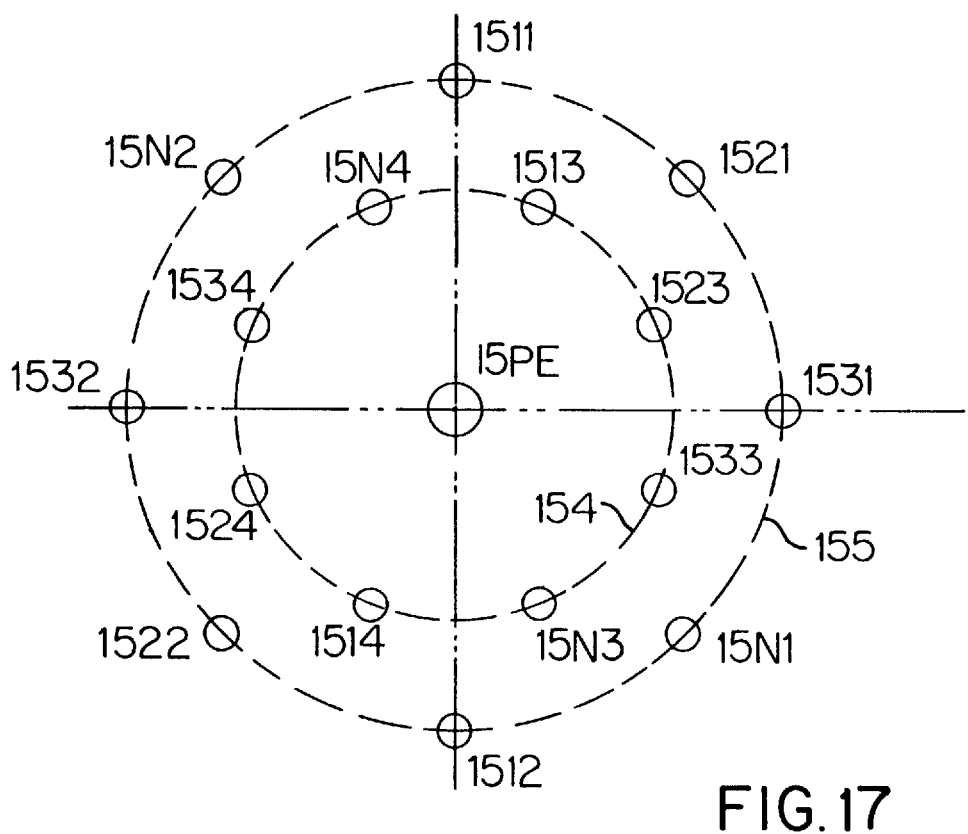
FIG. 17 shows a cable for transmitting three-phase current in three phases in a star connection, e.g. with a neutral conductor, and with a PE and special twisting to give additional magnetic field compensation.

FIG. 17 shows an arrangement of conductors in a cable which specifically fulfills exacting requirements regarding magnetic field compensation and is suitable for three-phase current transmission with a neutral conductor (star connection) and a centrally arranged ground conductor 14PE. The three phase conductors 151,152,153 are each divided into four single conductors 1511 to 1514; 1521 to 1524; 1531 to 1534. They are distributed in equal proportions around the cross-section of an outer circle 155, and in the example shown, have a right-hand twist (1511,1512; 1521,1522; 1531,1532) or alternatively, they are have an opposing twist (left-hand twist) and are distributed evenly around an inner circle 154 (1513,1514; 1523,1524; 1533, 1534). Given asymmetrical three-phase current operation, the neutral conductor 15N also carries current, therefore this conductor also has to be included in the distribution system. This means that the single conductors 15N1, 15N2 have to be evenly distributed around the outer circle 155, and the single conductors 15N3 and 15N4 have to be evenly distributed around the inner circle 154. In order to shield the electrical field, the protective earth can be incorporated in the form of single conductors split as often as required and arranged outside the outer conductor which has a right-hand twist or additional shielding can be provided for this task using familiar methods.

Figure 18:
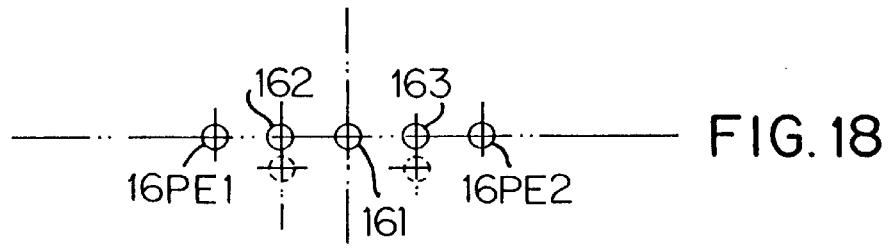
FIG. 18 shows an arrangement referred to as a twin lead, however configured in accordance with the present invention with single phase current supply and two PE conductors.

FIG. 18 shows an electrical line system arranged in accordance with the present invention in the form of a twin lead, for a two-phase system with conductor 161 and the conductor which is split into two parts 162, 163 which are arranged symmetrically around the conductor 161. If necessary, a protective earth 16PE1 is arranged around the outside, which can be supplemented by a second, symmetrically arranged protective earth 16PE2 in order to improve the shielding of the electrical field.

Twin leads are generally located in the surface zone of plastering on walls. This means the main threat from radiation is from that side of the wall in which the twin lead is located in the plaster, because it is not possible to approach the lead from the other side of the wall by a distance less than the thickness of the wall. Investigations have revealed that the radiation diagram for a twin lead as shown in FIG. 18 in the plane of the diagram is such that a minimum radiation level is ensured perpendicular to the plane of the conductor, related to conductor 161, and that in directions at an angle of 45° to this conductor, the magnetic field is indeed compensated, but to a notably inferior degree. However, if the positions of single conductors 162 and 163 are moved somewhat outside the plane of the twin lead conductor and if the twin lead is moved to a different position in the wall so that the single conductors are moved to a position where they are less deeply recessed into the wall than the conductor 161, it can be seen that the total magnetic field of the twin lead on the plastered side of the wall is considerably reduced, and that the previous adjacent 45° maximum values practically disappear. An analysis of the vectors involved showed that if the distance between conductors 161 and 162 or 161 and 163 is approximately 10 mm each and a height offset of approximately 10% of the distance between the conductors is introduced, that is to say approximately 1 mm, these measures have the effect described above, and this effect applies at a distance of approximately 100 mm from the twin lead.

Figure 19:
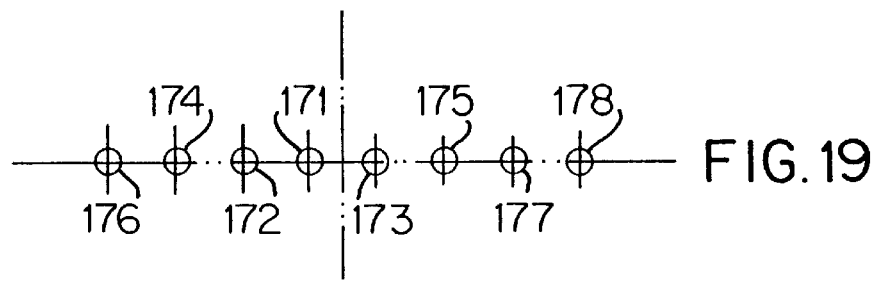
FIG. 19 shows a twin lead for transmitting three phase current in three phases with a neutral conductor and PE.
Figure 20:
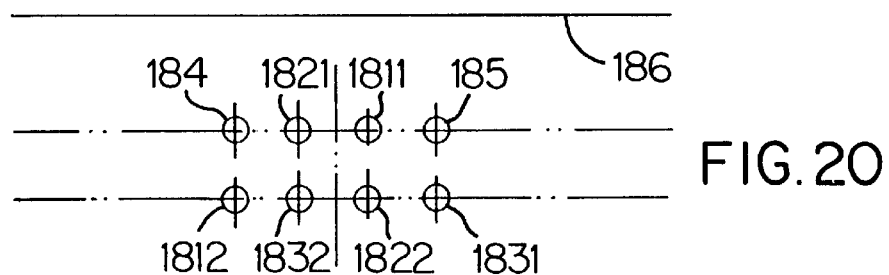
FIG. 20 shows a modified twin lead in accordance with FIG. 17.

FIG. 19 shows an electrical line system in the form of a twin lead for a three-phase current system. Two other conductors are split into two parts 172, 173 and 174, 175 and are arranged around the phase conductor 171. It can be expected that even the neutral conductor will carry certain currents, and so this conductor is also split into two parts 176, 177 and arranged symmetrically. An additional conductor 178 serves as the protective earth. The eight individual conductors can also be realized using two twin leads arranged adjacent to one another. FIG. 20 shows the same system as FIG. 19, with the system realized using two twin lead planes arranged in a stack in this case. In this illustration, both the other individual phase conductors are located as closely as possible to each phase single conductor in order to achieve optimum magnetic field compensation, conductor 1821 with conductors 1812 and 1832, conductor 1811 with conductors 1822 and 1831, conductor 1812 with conductors 1821 and 1832, conductor 1832 with conductors 1821 and 1812, conductor 1822 with conductors 1811 and 1832, conductor 1831 with conductors 1811 and 1822. In order to reduce the electrical field radiation, the neutral conductor 184 and the PE or protective earth conductor 185 are located on the room side.

Figure 21:
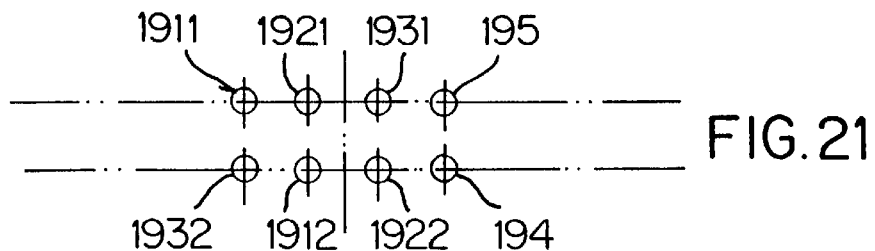
FIG. 21 shows a twin lead similar to the twin leads in accordance with FIG. 18, however with particularly thorough magnetic field compensation.

FIG. 21 shows an even denser concentration of the three phase conductors in relation to the cross section of the cable. The PE (protective earth) 194 and the neutral conductor 195 are located at the side in the double layer arrangement of the twin leads.

It is sensible for the twin leads shown positioned in a stack in the figures mentioned above to be combined into a single cable by enclosing them in one covering. In the case of standard twin leads, this unified covering can take the form of an outer sheathing made of standard flexible material.

As far as insulation for these cables is concerned, the forms to be recommended are those such as explained, for example, in the book "Haustechnik" by Holger/Laasch, published by B. G. Teubner, Stuttgart 1989, on pages 353 and 354, for example types NYIF, NYM and NYY. Concerning the extension cables which have been mentioned, the construction must have the standard degree of flexibility, especially in the case of the single conductors.

Figure 22:
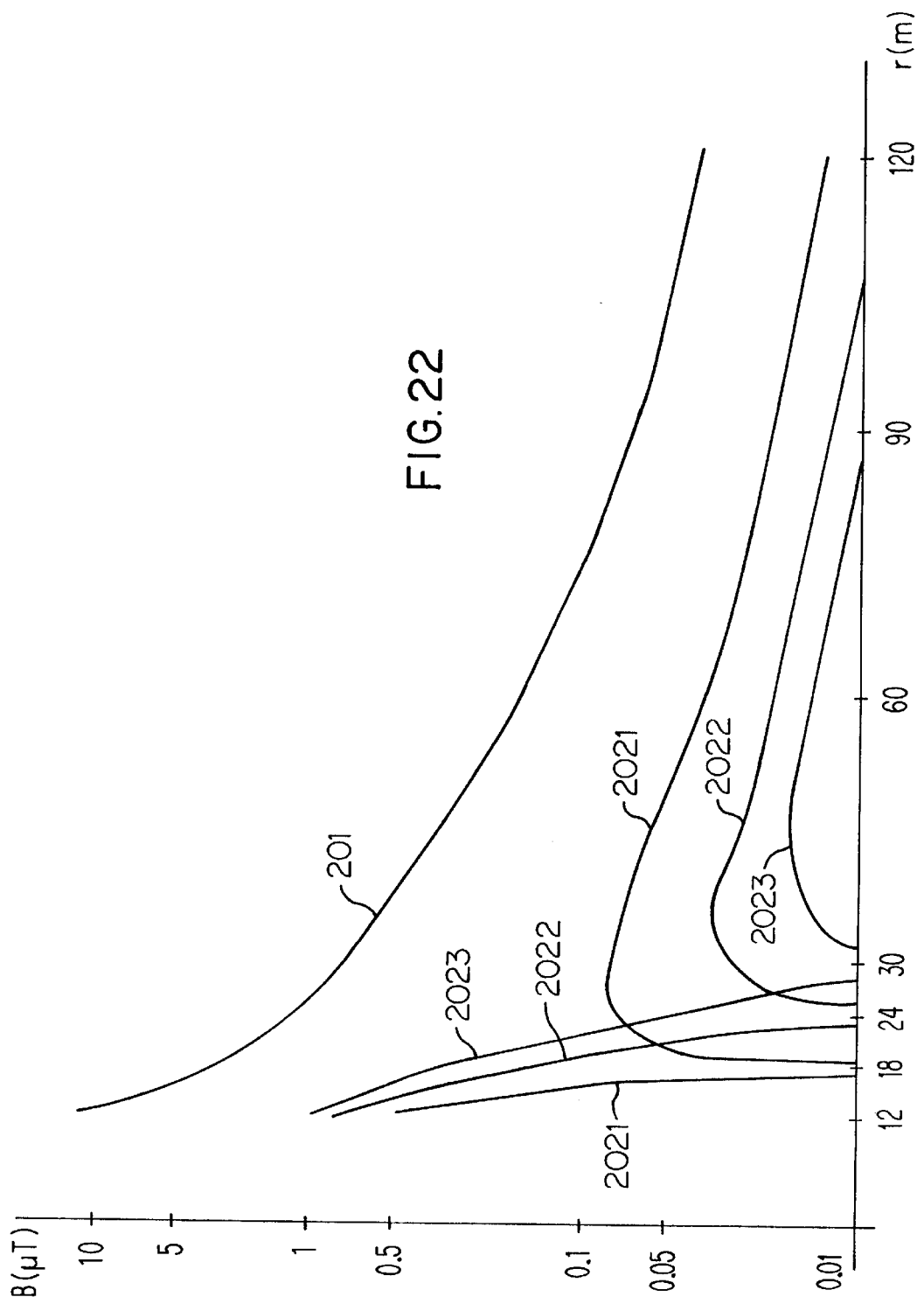
FIG. 22 shows a diagram which makes clear the effect of an embodiment configured as in FIG. 3 in accordance with the present invention.

FIG. 22 shows, for example, the results which can be obtained using a line system constructed in accordance with FIG. 3. This is therefore a single phase system. The measurement on the abscissa axis is the distance from the outermost conductor in meters. The ordinate axis records the magnetic flux density of the magnetic field in micro telsa depending on the value given at the corresponding distance value.

Curve 201 shows the condition without compensation for the same current value. The remaining curves show the sequence for the following conditions:

2021 the compensation point PK upon which the calculation is based is positioned at a distance of approximately 18 meters from the solder of the outermost conductor on the surface of the earth (ordinate), 2022 as above, at a distance of approximately 24 meters, 2023 as above, at a distance of approximately 30 meters, with the PK at a corresponding height to the height of the center of the line system which is connected to earth in each particular case. The clear reduction effect is apparent. The telsa values given are calculated from the current presumed to be flowing in the system and the system geometry.

Figure 23:
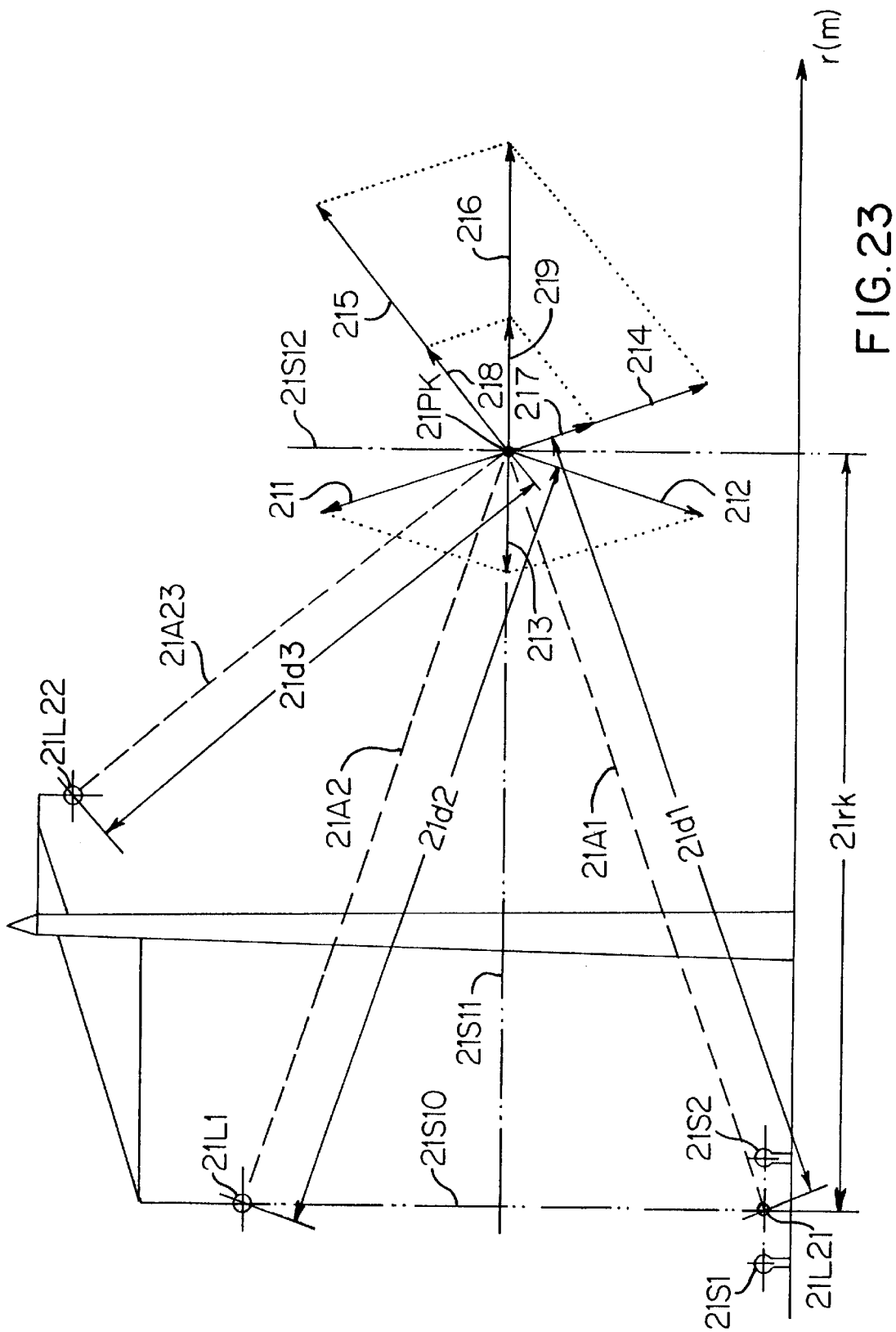
FIG. 23 shows a railway traction current system with an overhead contact line and the track as conductor of the primary line system and a single conductor located above ground.

FIG. 23 shows a possible method of reducing the AIB in the vicinity of railway systems by the traction current of electric locomotives of the type used by the Deutsche Bundesbahn (German Federal Railways).

In this case, the single phase current flows in the overhead contact line 21L1 and flows back as a return current along rails 21S1 and 21S2. This arrangement has the vertical axis of symmetry 21S10.

The magnetic field is minimized at compensated point 21PK which is located at the distance 21rk from the axis of symmetry 21S10 of the rail system. As far as the height is concerned, the compensation point 21PK is fixed by the horizontal axis of symmetry 21S11. This point is at a distance 21d1 from the rails 21S1 and 21S2, and is at the same distance 21d2 from the overhead contact line 21L1.

A single-phase current in the outward and return conductors (21L21, 21L22) compensates the magnetic field at point 21PK. The outward and return conductors 21L2, 21L22 are located symmetrically to the axis 21A2 at a distance of 21d1 or 21d3 from the compensation point 21PK.

Due to the current in conductors 21L1, 21L2 and due to the distance of these conductors from the compensation point 21PK, a magnetic field is generated at the compensation point PK whose characteristics are defined by vectors 211 and 212 in FIG. 23. The currents in conductors 21L1 and 21L2 are opposite in sign above and below the axis of symmetry 21S11. Accordingly, a mirror-image magnetic field is generated at compensation point 21PK by the compensation current in conductors 21L21, 21L22 and 21L1. The partial components 214 and 215 (assuming equal values for the traction current and the compensation current) add up to the value 216. This means vector 219 can be created simply by finding the necessary geometrical arrangement and compensating current value. The value of vector 219 will then correspond to the value of vector 213, and will share the same axis of directional orientation. The vectors compensate one another fully because they lie at an angle of 180° to each other (phase opposition). The pre-requisite for continuous total compensation of the magnetic field is that the temporal sequence of the currents in both systems should be identical. It is advantageous if only the strength of the current in conductors 21L21 and 21L22 is important as the outward and return current for magnetic field compensation. In this case, the circuit can be operated with the minimum current required for generating the current necessary for compensation. This means the compensation current system uses a practically negligible amount of electrical power.

Figure 24:
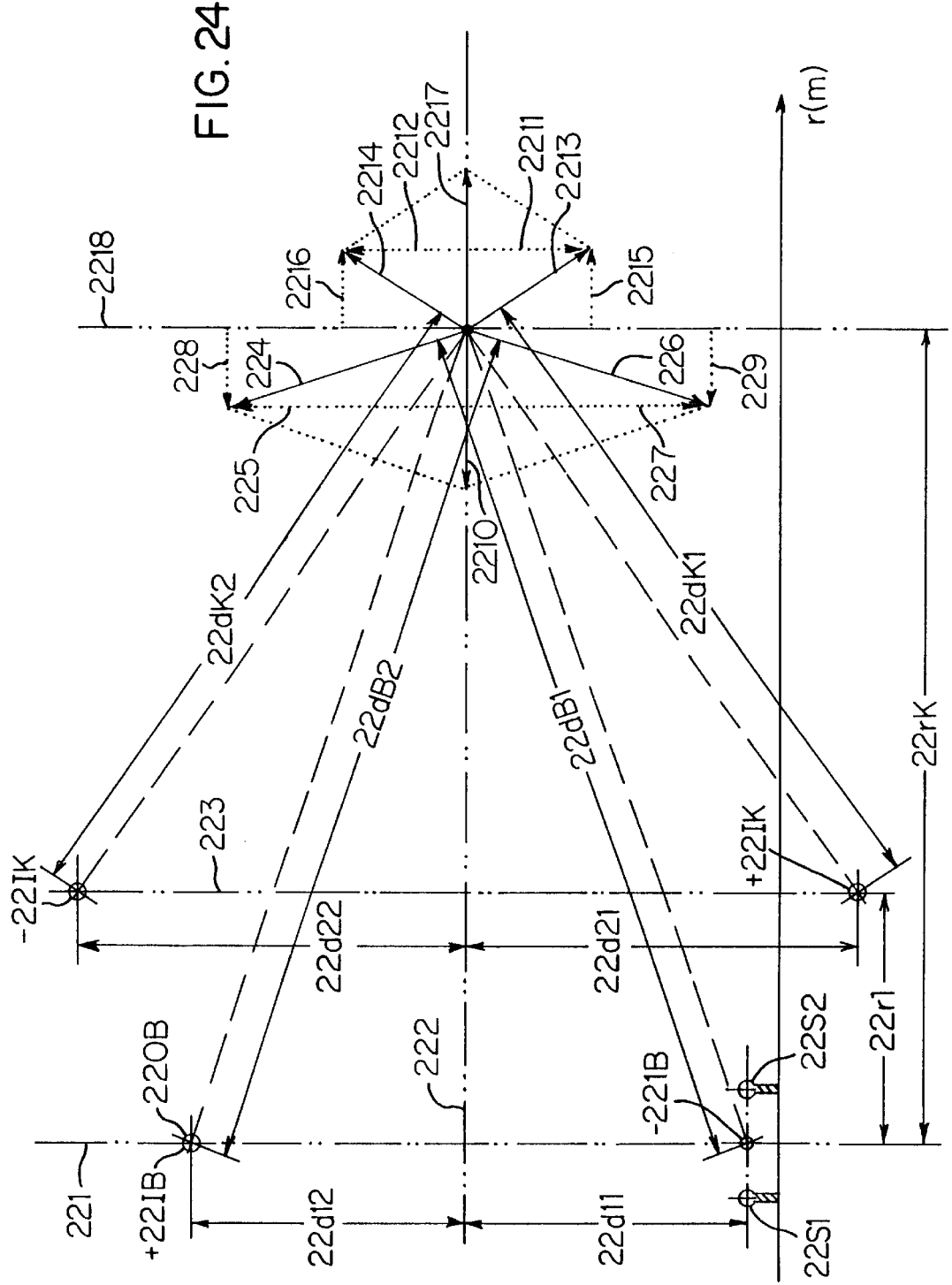
FIG. 24 shows a railway traction current system with an overhead contact line and the track as conductor of the primary line system in accordance with FIG. 23 and a single conductor located underground.

In contrast to the application shown in FIG. 23, the second single conductor of the compensation line system which carries the current +22Ik can be located in the ground. This arrangement is shown in FIG. 24. This figure also shows the single conductor 21L22 with current −22IK which provides even more straightforward compensation. This single conductor can however be discarded, and in this case the vector pattern is altered accordingly. This method offers the advantage that the standard railway line layout is not different from the previous one. The arrangement shown in FIG. 24 has the single conductor located in the ground, current +22IK and the single conductor 21L22 with current −22IK, and offers the significant advantage that there are no spatial restrictions on the area within which effective single conductors can be located.

If one is prepared to accept specific locational restrictions regarding the position of the single conductor in the ground in order to provide an effective solution in accordance with the present invention, the additional single conductor 21L22 can be discarded. In this case, the compensation current −22IK which would have been carried in this conductor should be passed through the track 21L21.

Figure 25:
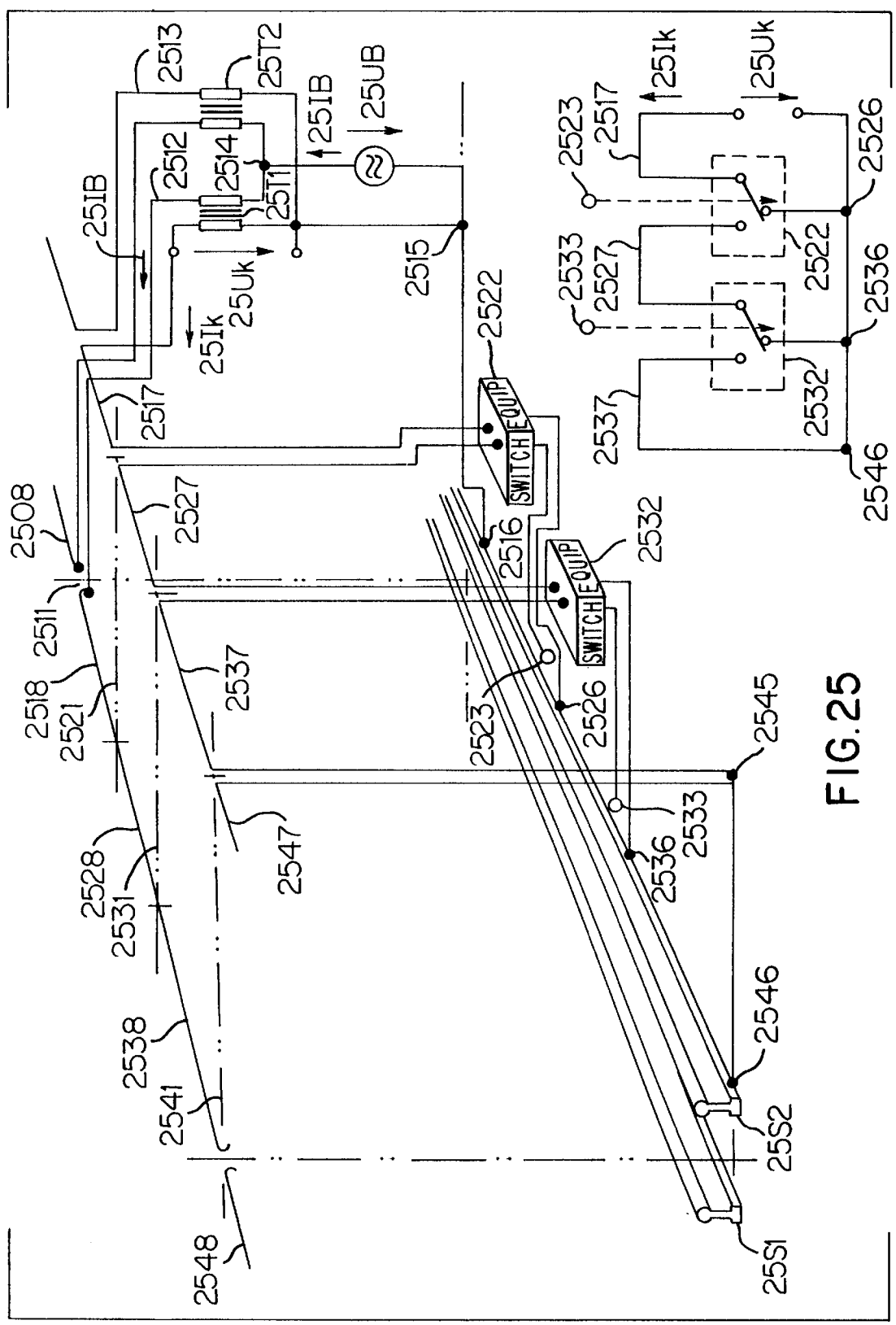
FIG. 25 shows a railway traction current system in accordance with FIG. 23, in which the additional single conductor is divided into sections which are connected by switching equipment.

In FIG. 25, the time-dependent course of the current or the course of the magnetic field resulting from the current is to be taken into consideration in addition to the time-dependent occupancy of sections of a current supply section, for instance between a separation point 2511 for current feed and an overhead contact line separation point 2541. In practice, compensation cannot be achieved exactly up to the point where the moving train is currently located. If the distances between the overhead contact line separation points are large, this would mean that at times a section of the overall system would not be in a compensated condition and would be radiating, which is not desirable. In a further development of the present invention, this difficulty can be countered by for example not assigning a compensation section of the same length to the individual current supply sections 2511 to 2541, and instead subdividing the compensation section into several considerably smaller sections 2517, 2527 and 2537 each of which has, for example, the same length. Sensor devices 2523 and 2533 are fitted next to the tracks at the transition points 2521, 2531 of the individual subsections which lie between the termini 2511 and 2541, whereby the sensor devices 2523 and 2533 emit an electrical signal by means of an outgoing coil when current flows in the track and the electrical signal is used to confirm one of the items of switching equipment 2522 or 2533 which are each assigned to one of the sensors. These items of switching equipment each only provide compensation current to those subsections in which operating current for the train is flowing in the railway traction current circuit. For this function to be effected, it is advisable for the individual items of switching equipment to contain one normally open contact pair and one normally closed contact pair. The circuit details can be seen in FIG. 25. The relay contacts are illustrated in the rest position. In this circuit, the compensation cable system is supplied with the required compensation current 25IK section by section from transformer 25T1 as a function of the traction current 25IB flowing in each section at the time. The transformer 25T2 supplies the adjacent current supply section, starting with 2511. Both the current supply sections from 2518 and 2508 are electrically separated at point 2511. When the locomotive crosses the supply section separation point 2541 traveling in the direction 2538→2548, no more current flows between 2511 and 2541. All direct connections in the compensation line system are reestablished in the items of switching equipment 2522 or 2532. If the locomotive is traveling in the opposite direction 2548→2538, the traction current 25IB influences all sensor devices 2523 or 2533 through their transducer coils and the entire section is supplied with compensation current. After the sensor devices 2533 or 2523 have been passed, the appropriate normally open and normally closed contact pairs ensure that their assigned subsections are cleared of compensation current.

The arrangements described below are concerned with further advantageous details regarding connection equipment for cables and lines referred to as extension cables, such as those used for electrical devices in the home.

Figure 26:
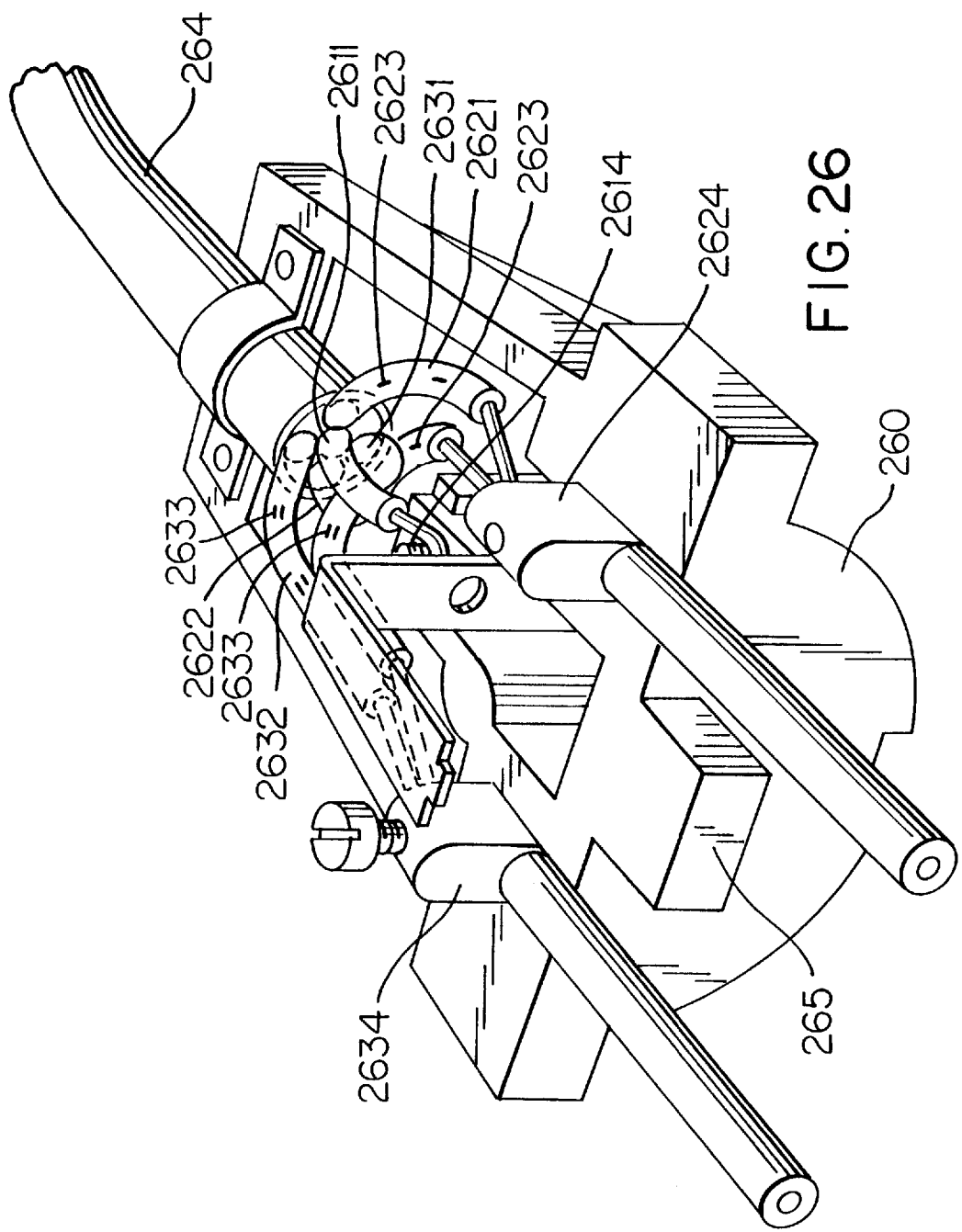
FIG. 26 shows the connection of a cable and its single conductors to the screw-type terminals of a standard safety plug.

FIG. 26 reproduces the connection of an extension cable to a standard safety plug 260. In place of the previous standard cable with three conductors, a cable 264 with five conductors is used, which is connected to the screw-type terminal of the plug in such a manner that the ground conductor 2611 is connected to the screw-type terminal 2614 provided for it and, of the other four remaining conductors (two of which form the neutral or zero conductor and two the phase conductor), the single conductors of the neutral conductor 2621, 2622 are connected to the screw-type terminal of one of the connector pins 2624 and the single conductors 2631, 2632 of the phase conductor are connected to the screw-type terminal of the other connector pin 2634. Both the single conductors of the neutral conductor and both the single conductors of the phase conductor each have the same marking to guarantee correct connection allocation to both cable ends (double dot marking 2633 for the phase conductor 2634 and single dot marking 2623 for the neutral conductor 2624).

When using low-radiation electrical conductors such as those used as extension cables or as device connection leads, it is particularly advisable from the point of view of providing shielding against the electrical field to design the plug connections so as to provide reliable protection against switching over the connection contacts.

This purpose is served by a small lug 265 which lines up with a corresponding indentation in the mating part of the plug connection, in other words in the safety socket or in the safety in-series adapter. As illustrated, the lug can have a square block shape or be a blunt pyramid, or else be pin-shaped or in the form of a frustum of a cone.

Due to the large number of conductors which have to be specified in the screw-type terminal equipment in accordance with FIG. 26, a shape which is different from the version used as standard is to be recommended.

Figure 27:
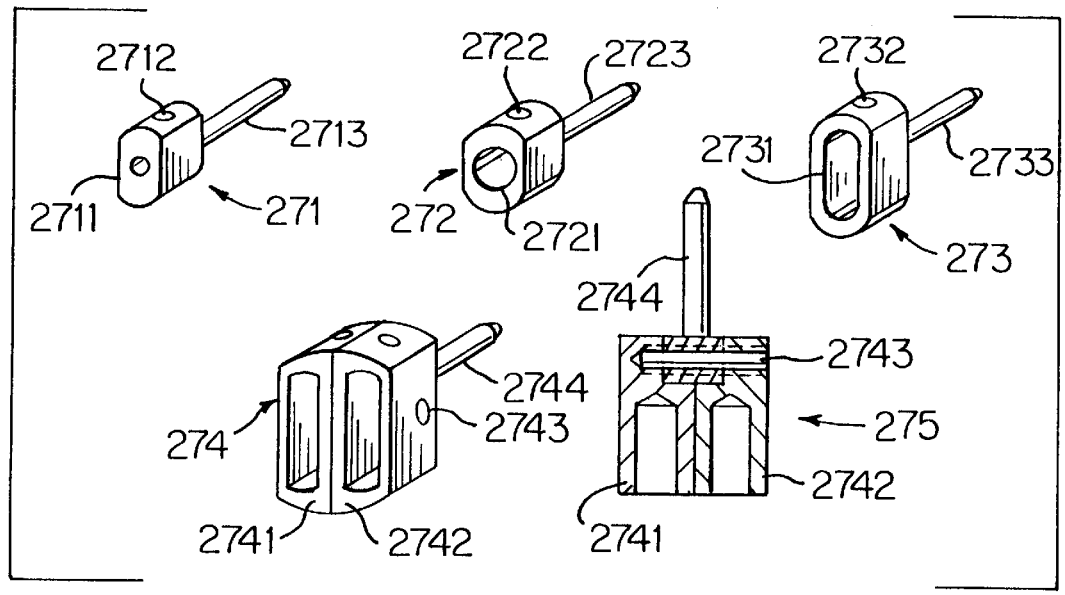
FIG. 27 shows an advantageous configuration of the plug in accordance with FIG. 26 which simplifies clamping of the single conductors.

FIG. 27 shows a favorable terminal device arrangement for plugs, sockets, in-series adapters or device connections. Several types of arrangements are presented together in this figure.

The standard arrangement 271 incorporates a terminal section 2711 with the terminal screw 2712 which passes into the contact pin 2713. A bore in 2711 is provided for accommodating the conductor or wire.

For the purpose of the present invention, a bore is provided with a larger diameter as shown by the terminal section 272 with the terminal screw 2722, contact pin 2723 and bore 2721. In the standard arrangement, the diameter of the bore is approximately 2 mm. For the purpose of the present invention, this diameter should be at least approximately 4 mm in order to ensure that the wire can be introduced easily.

Another possibility is to design the terminal section in the form of a slotted hole 2731 as shown on the terminal section 273. Number 2732 is the terminal screw and 2733 is the contact pin.

Given a large number of single conductors, it is to be recommended that the terminal section 274 should consist of two terminal sections 273 which are held together by means of a screw connection 2743. The two terminal sections are numbered 2741 and 2742.

These types of arrangements are especially interesting for cables and cable connections in accordance with FIGS. 11, 12 and 13.

As already mentioned, cases may arise in which it is desirable to provide a safety mechanism to prevent the connection contacts from being swapped over out of their correct positions when the mating part is plugged in, for example to maintain the electrical shielding already mentioned. In the device shown in FIG. 26, it is necessary to design the plug and its mating part specifically to achieve this. This difficulty can be countered by providing at least one push-on disk for the plug, and in a preferable embodiment, a corresponding push-in disk for the mating part, for example the safety socket.

The push-in disk 281 incorporates the standard notches for safety connections. These are indicated by number 2813. However, the holes 2811 and 2812 for the contact pins have small lug-shaped projections 2814 which protrude into the cross-section of the hole. A groove-shaped channel corresponding to each lug-shaped projection is incorporated into each individual contact pin of the plug (not shown in FIG. 28). This means the plug can also be used in standard safety sockets and in-series connections, and standard safety sockets and in-series connections can also be used for the purposes of the present invention.

Figure 28:
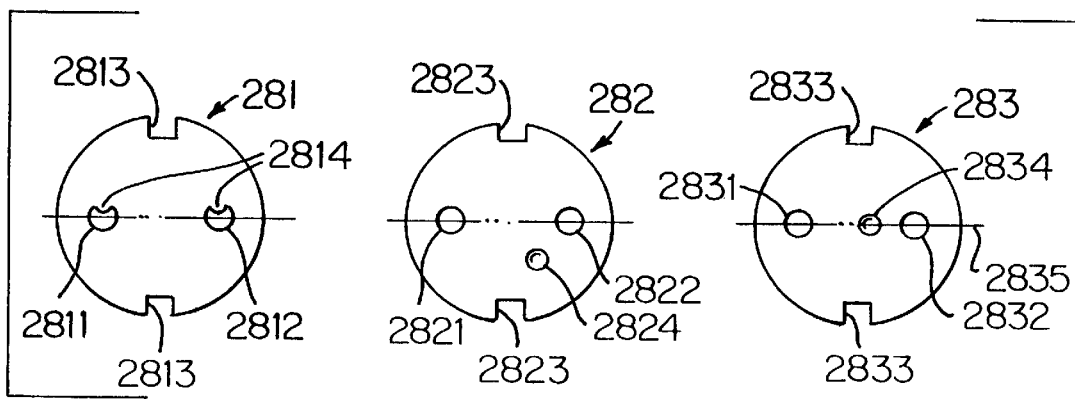
FIG. 28 shows a male connector and female connector configuration which ensures that the connection can only be effected in a pre-specified position.

If the operator does not wish the shape of the contact pins to be different from the standard form, an arrangement along the lines of numbers 282 or 283 shown in FIG. 28 is to be recommended. In 282, the push-in disk incorporates an indentation 2824 for accommodating a pin correspondingly arranged in the plug, similar to the lug 265 in FIG. 26. The indentation is located in an off-center position outside the plane of a theoretical line 2835 whose course is determined by the contact pins. Numbers 2821 and 2822 are the openings for introducing the contact pins. Number 2823 refers to the familiar notches in safety connections. In number 283 the indentation 2834 is indeed located on the plane of line 2835, but is in an asymmetrical position. In 283, number 2833 denotes the standard safety connection notches and numbers 2831 and 2832 refer to the openings for insertion of the contact pins.

Figure 29:
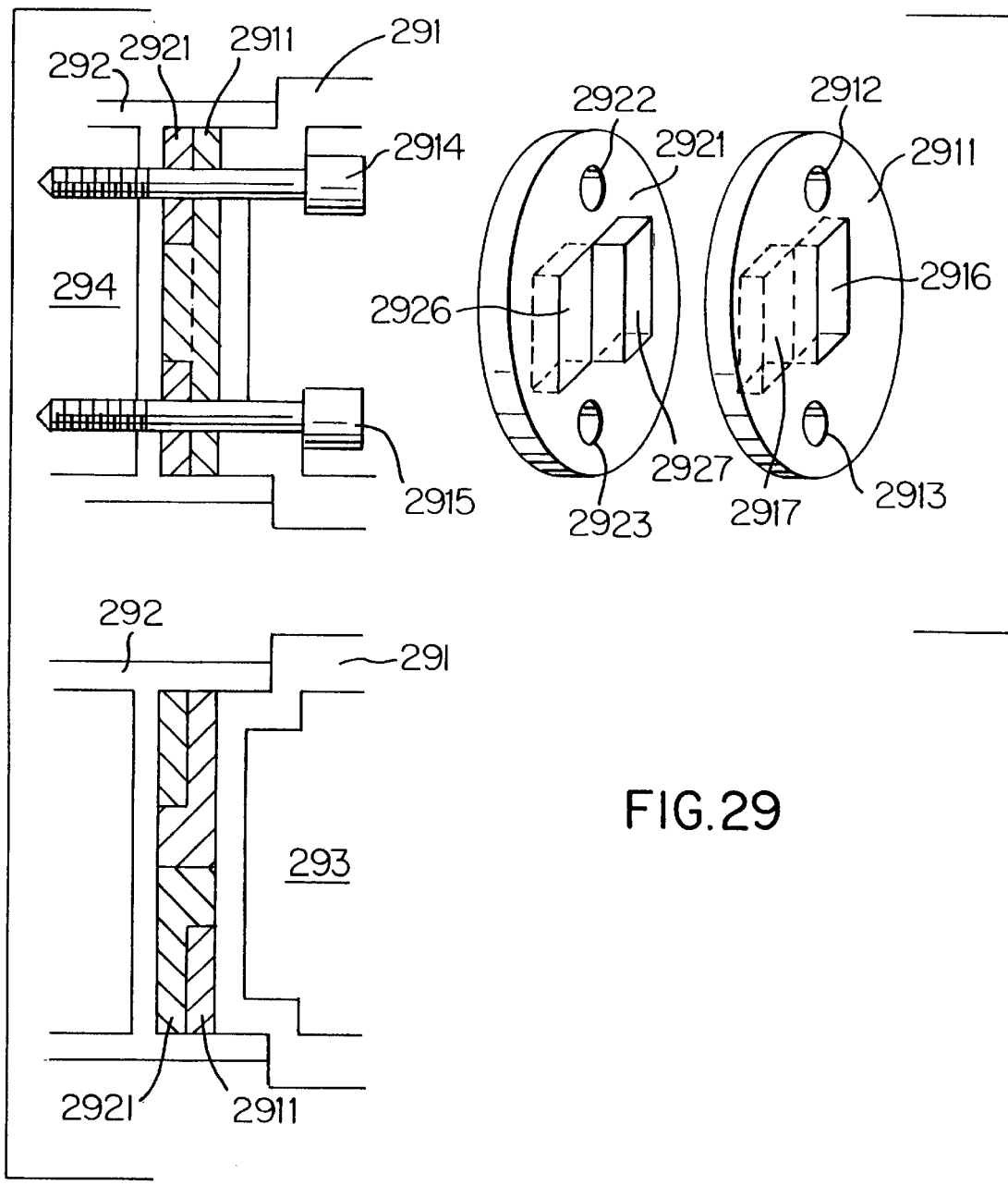
FIG. 29 shows two components which enable a standard safety plug-and-socket connection to be modified in accordance with the connection in FIG. 28.

FIG. 29 shows another push-in disk 2911 and a corresponding push-on disk 2921 appropriate for an arrangement in accordance with FIG. 26. The lug marked 2917 is the same type as 265 and the corresponding accommodation mechanism or indentation in the push-in disk 2911 is numbered 2926. In addition, an engagement profile of a similar type projecting in the opposite direction is provided. This consists of a lug 2927 in the push-in disk 2921 and a corresponding indentation 2916 in the push-on disk 2911. The position of the individual parts when plugged together can be seen from the two cross-sectional views 293 and 294 of the connection. This arrangement offers the additional advantage that if the two connection elements are pushed together incorrectly, the lugs line up with each other, thus making it very difficult if not impossible to form a connection.

Push-in disks are themselves used in safety sockets of prior art, where they are referred to a child-proof inserts. As is known, these inserts cover the openings into which the contact pins are inserted when the socket is in use. In a further embodiment of the present invention, the push-in disks serve, in contrast to this mechanism, the purpose of unambiguous allocation of the neutral conductor pin of a plug to the neutral conductor bushing in the socket or in the mating in-series adapter component. As in the case of the inserts of prior art, these push-in disks can be held in place by a clamping mechanism. In the case of a plug, the push-on disk is designed as a mating part and simply pushed on, where it is held on either by means of the standard central screw or else by being stuck on with glue. Furthermore it is advantageous if a socket or mating part of an in-series adapter which is provided with a push-in disk in accordance with a further embodiment of the present invention can also be used for the familiar two pin Euro plug (plain connector). To this end, a push-on disk of an appropriate design can be allocated to this plug.

The method of examination applied in order to explain the present invention is based on the assumption that the entire system is to be viewed as a quasi-static system, because the conductor clearances and also the distance between the compensation zone and the line system are so small in relation to the wavelength determined by the operating frequency of the line system, that it is possible to assign the compensation zone to the narrowest proximity.

If one considers the distribution of the magnetic field in a cross-sectional plane through the line system, it becomes apparent that the magnetic field in the plane of the cross-section demonstrates maximum and minimum zones whose angular position and distance related to the line system are dependent on the geometrical position of the individual conductors and on the currents flowing within these conductors.

In the sample arrangements presented, the arrangement of the single conductors is purposely such that they are located in a stack—related to the compensation zone. In a further embodiment of the present invention, it is however also possible to arrange the single conductors in a cascade—related to the compensation zone. In accordance with this further embodiment, it is also possible to locate the single conductors both in a stack and in a cascade. These cases are explained in more detail with the assistance of the sample arrangements shown in FIGS. 30 to 34. In the final analysis, this amounts to a broader application of the split conductor principle explained above.

Figure 30:
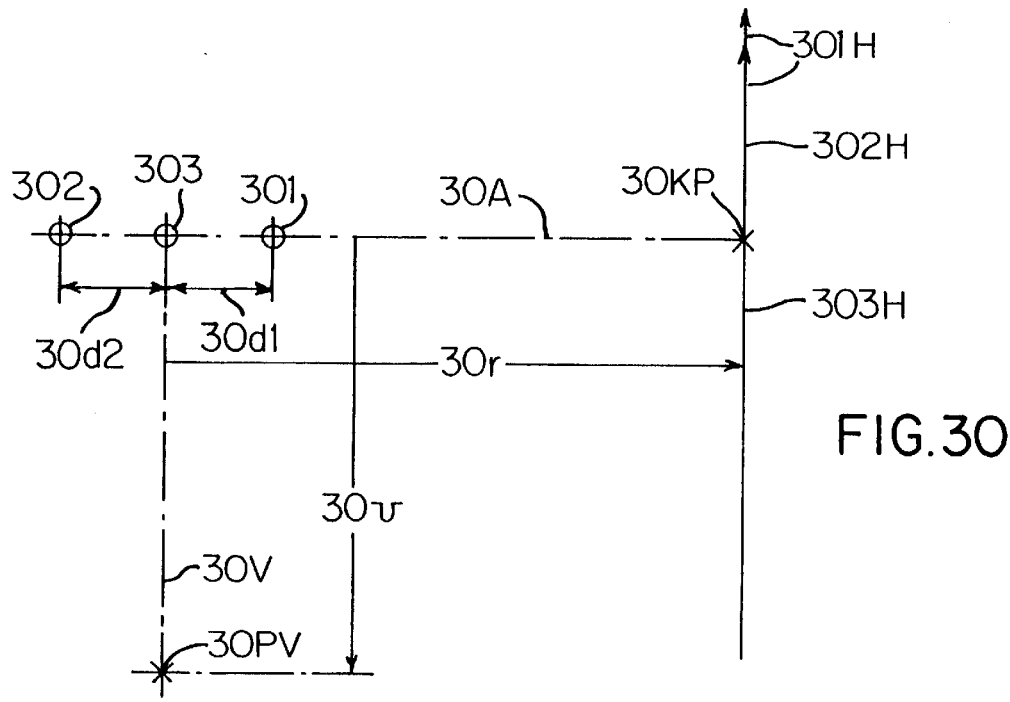
FIG. 30 shows a further development in respect to the arrangement of the conductors.

FIG. 30 shows a single phase line system with one outward and one return conductor. The outward current flows in the outward conductor 303 whereas the return current, split into two equal parts, flows in the return conductor which is split into the single conductors 301 and 302. The cross-sectional plane of the line system (which is presumed to lie in a straight line) formed by the individual conductors is shown in the plane of the drawing. In a symmetrical arrangement of conductors, all three conductors are located along an axis 30A, and the clearances 30$d1$ and 30$d2$ between the conductors are equal. At a certain distance 30$r$ along the axis 30A from conductor 303 which is located in the center, the magnetic field generated by the currents flowing in the conductors is shown to alter with distance and be inversely proportional to distance 30$r$. If one observes the magnetic field at a point 30KP located on the common axis 30A of the three conductors, the size of the magnetic field 303H to be allocated to conductor 303 is determined by the distance 30$r$. Magnetic fields 301H and 302H at point 30KP are generated by the currents flowing in the opposite direction in both conductors 301 and 302 and have the same direction of orientation as the magnetic field 303H which is generated by the current flowing in conductor 303 but with opposite signs (phase opposition). Additionally, in the example only one current each is flowing in conductors 301 and 302 and this is half as large as the current in conductor 303. The following situation applies in respect to the distance: 301H is a function of $1/(30r-30d1)$ and 302H is a function of $1/(30r+30d2)$. Therefore, the magnetic field 301H is slightly larger than half the value of 303H and the magnetic field 302H is slightly smaller than half the value of 303H.

Although the currents generated in the conductor 301 and 302 are of the same amount at the start, in other words half as large as the current in conductor 303, the sum of the magnetic fields 301H and 302H at point 30KP is therefore not identical to the size of magnetic field 301H which is generated by the current flowing in conductor 303. As can be shown for example by means of a series expansion, the currents in both the externally located conductors always generate a slightly greater total magnetic field at point 30KP than that field generated by the current flowing in conductor 303; in other words, $(301H+302H) \approx 303H(1+(30d/30r^2))$, if the arrangement of conductors is symmetrical, i.e. if the distances 30$d1$ and 30$d2$ from the central conductor are identical ($30d1=30d2=30d$).

Zero balancing of the magnetic field can however be effected if the distance of the conductor 301 and/or the distance of conductor 302 from point 30KP is increased until the total magnetic field to be allocated to these two conductors is reduced to such a size that it corresponds to the magnetic field generated by the current flowing in 303. This asymmetrical arrangement of conductors has the corollary that the magnetic field compensation on the side of the line system which is facing away from point 30KP (30$r$<0) is slightly reduced.

In accordance with the directives arising from the present invention, the following observations consequently arise in connection with the use of split conductors (single conductors) in a line system:

In a line system originally with n current-carrying paths, when the conductors are routed in parallel with the route of the cable, at least 2n−1 conductors are required in order to produce an arrangement in accordance with the present invention, for example in the case of a single phase system this is three conductors and five conductors for a three-phase system. If the conductors do not run in parallel to the axis of the cable, as for example if the conductors are twisted in a power cable, it is advantageous if all conductors are split at least once. This procedure therefore requires at least four conductors, taking the example of a single phase system, and at least six conductors for a three-phase system.

Figure 31:
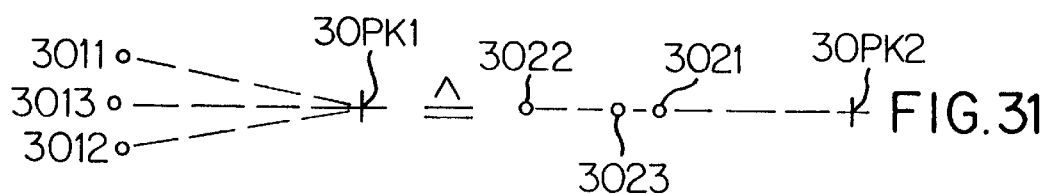
FIG. 31 shows an explanation of the further development in accordance with FIG. 30 for a single phase system.
Figure 32:
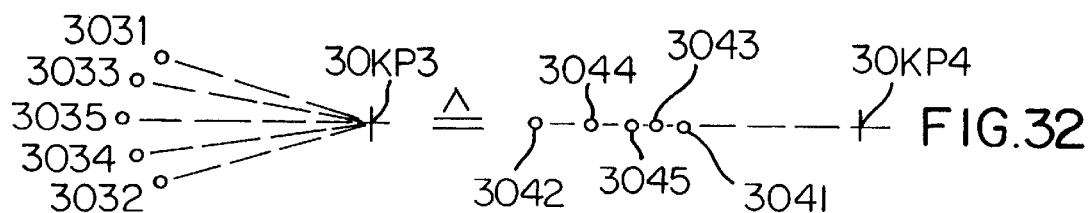
FIG. 32 shows an explanation of the further development in accordance with FIG. 30 for a three-phase current system.
Figure 33:
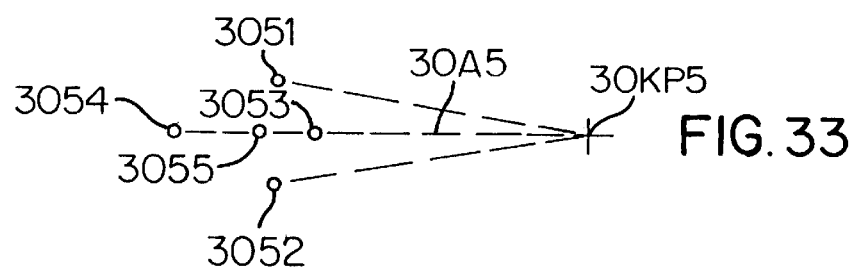
FIG. 33 shows a combination of various types of arrangements for a three-phase current system and FIG. 34 shows a sample layout for effecting compensation in several areas of space.

FIGS. 31 to 33 show fundamental possibilities for conductor arrangements which adopt this principle to achieve zero field compensation at point 30KP.

FIG. 31 shows a single phase system with conductors 3011 to 3023. FIGS. 32 and 33 show a three-phase system with conductors 3031 to 3055.

To enable easier comprehension, FIGS. 31 and 32 also show the corresponding single conductor distributions for the arrangement with conductors in a stack as described previously. In this case, the split conductors 3011, 3012 and 3031 to 3034 and 3051,3052 are arranged with symmetrical axis angles in order to achieve magnetic field compensation in the individual single conductors which carry equal partial currents. Arrangements which have asymmetrical axis angles require different distances between the single conductors and the compensation point and/or different current distributions amongst the single conductors. In contrast, the single conductors 3021, 3022 and 3041 to 3044 and 3053, 3054 are all on the same axis. In both cases, therefore, the directions of the field vectors which are to be assigned to all original (i.e. unsplit) conductors possess the same orientation, as is required for complete magnetic field compensation.

In order to achieve zero field compensation, it is therefore only necessary to adjust the vector values so that the sum of the vector amplitudes, with due consideration for the orientation and signs of the vectors, is at least approximately zero. This can be arranged by selecting the distance between the split conductor and the compensation point 30KP and/or, in the case of the magnetic field, by distributing the current accordingly in the current path between the (split) single conductors which make up the current path.

FIG. 33 shows a combination of both of these types of compensation arrangements for conductors 3051 to 3055 in a three-phase system. Both matching (split) single conductors 3051 and 3052 are arranged symmetrically in relation to their axis angles to the compensation point 30KP5 whereas the two (split) single conductors 3053, 3054 lie on a common axis to the unsplit conductor 3055 and the compensation point 30KP5. As a consequence, all combined vectors have the same orientation in relation to axis 30A5 provided that the current is distributed accordingly.

Both these types of compensation open up another advantageous possibility, namely to achieve simultaneous compensation in several areas of space at once. If one looks at FIG. 30, it is apparent that a situation corresponding to that described using FIG. 3 results for the remote axis 30V at a right angle to the remote axis 30A defined by conductors 301, 302, 303.

As a further development of the present invention, if for example, the unsplit conductor 303 is positioned slightly further back in an arrangement in accordance with FIG. 30, whereby this conductor 303 is positioned in the region 30v<0, a further compensation zone is created around 30PV if the currents in the individual conductors are distributed accordingly. The result is an arrangement similar to that described in detail using FIG. 3. It is true that the zero compensation of the magnetic field in the 30r direction is slightly reduced, but this effect is nevertheless of only of a secondary order, and can therefore generally be neglected. The zero value for 30v and also for 30r is at the intersection of axes 30V and 30A. Consequently, negative values of 30v and 30r are located on the opposite side of the zero point in each case.

Figure 34:
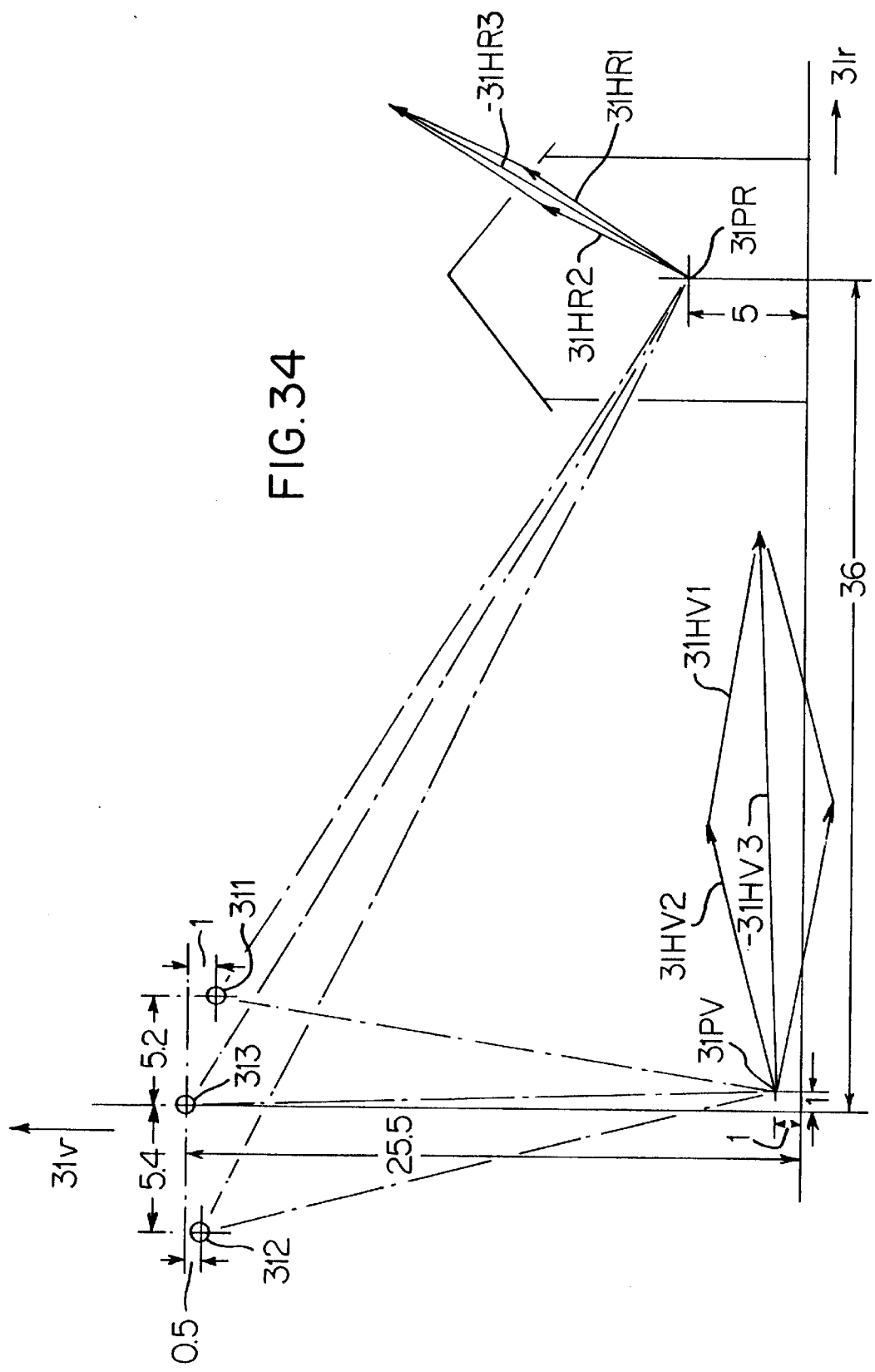

This finally produces an arrangement of conductors as shown in FIG. 34, where it is possible to achieve practically total zero compensation of the magnetic field at point 31PV and point 31PR by means of appropriate positioning of the conductors 311,312,313. The dimensions entered in the drawing are only valid for a specific current value which was taken as the basis for calculations, and represent distances in meters. With assistance from a suitable computer program, the two compensation points 31PV and 31PR of the magnetic field can be located wherever desirable over the surface area of the cross-sectional plane, and the magnetic field values can be minimized. In this way, the positions of the three conductors 311, 312, 313 can be determined for a specific application so that the magnetic field compensation achieved is optimally suited to the requirements. The sample arrangement shown in FIG. 34, for a high-voltage line with single phase operation, can be profitably used in cases where the first compensation point 31PV is located at approximately the height of a body standing directly beneath a high-voltage line, and where a second compensation point 31PR should be located laterally to the first, for example in the center of a house located on one side of the high-voltage line. Such cases occur in practice if, for example, a path runs under a high-voltage line which is used to supply a railway traction current circuit which passes through a residential area.

The present invention is, of course, in no way restricted to the specific disclosure of the specification and drawings, but also encompasses any modifications within the scope of the appended claims.

What I claim is:

1. An electrical line system comprising:
   at least one magnetically compensated line system unit comprising at least two main conductors for transmitting electrical energy and further comprising at least one auxiliary conductor extending parallel to said at least two main conductors;
   said at least two main conductors and said at least one auxiliary conductor being phase-synchronized when said at least one auxiliary conductor carries current during operation of said electrical line system;
   wherein said at least two main conductors and said at least one auxiliary conductor are arranged in a spatial arrangement relative to a first reference point in a first space extending parallel to said electrical line system, and wherein the currents flowing in said at least two main conductors and said at least one auxiliary conductor are selected such that a vector sum of the magnetic field components emanating from said at least two main conductors and said at least one auxiliary conductor is substantially equal to zero at said first reference point; and
   wherein said spatial arrangement is defined by a distance between said at least two main conductors and said at least one auxiliary conductor relative to said first reference point and by a spatial distribution of said at least two main conductors and said at least one auxiliary conductor relative to said first reference point.

2. An electrical line system according to claim 1, wherein:
   at least one of said two main conductors is a split conductor that is split into at least two single conductors and at least one of the remaining main conductors is an unsplit conductor;
   one of said single conductors functions as said at least one auxiliary conductor; and
   said spatial arrangement of said at least two single conductors is determined as a function of the currents flowing in said unsplit conductor and said at least two single conductors such that the magnetic field of said unsplit conductor is at least approximately compensated by the magnetic field of said single conductors in said first space extending parallel to said electrical line system.

3. An electrical line system according to claim 2, wherein the currents in said single conductors are in phase and wherein said single conductors are positioned on opposite sides of a plane defined by a longitudinal extension of said at least one unsplit main conductor and said first reference point.

4. An electrical line system according to claim 3, wherein ends of said single conductors are short-circuited to one another.

5. An electrical line system according to claim 3, wherein said single conductors have substantially identical electrical resistance and are positioned mirror-symmetrical to said plane.

6. An electrical line system according to claim 2, wherein the currents in said single conductors are in phase opposition and wherein said single conductors are positioned on a same side of a plane defined by a longitudinal extension of said at least one unsplit main conductor and said first reference point.

7. An electrical line system according to claim 6, further comprising an electrical power supply connected between said single conductors, wherein the current of said power supply is phase-synchronized with the current transmitted with said electrical line system.

8. An electrical line system according to claim 1, further comprising at least one magnetically non-compensated line system unit, wherein said at least one magnetically compensated line system unit and said at least one magnetically non-compensated line system unit extend substantially parallel to one another, wherein the magnetic fields of said at least one magnetically compensated line system unit and at least one magnetically non-compensated line system unit act on said first space extending parallel to said electrical line system, and wherein said at least one magnetically compensated line system unit has a spatial arrangement such that at least partially a compensation of the magnetic fields of said magnetically non-compensated line system unit is achieved.

9. An electrical line system according to claim 1, wherein said at least two main conductors for transmitting electrical energy and said at least one auxiliary conductor are arranged in a stacked arrangement relative to a plane defined by a center line of said first space and a center line of said electrical line system.

10. An electrical line system according to claim 1, wherein said at least two main conductors for transmitting electrical energy and said at least one auxiliary conductor are arranged adjacent to one another in a plane defined by a center line of said first space and a center line of said electrical line system.

11. An electrical line system according to claim 1, wherein said at least two main conductors and said at least one auxiliary conductor are arranged in a spatial arrangement relative to said first reference point in said first space extending parallel to said electrical line system and relative to a second reference point in a second space parallel to said electrical line system and wherein the currents flowing in said at least two main conductors and said at least one auxiliary conductor are selected such that a vector sum of the magnetic field components emanating from said at least two main conductors and said at least one auxiliary conductor is substantially equal to zero at said first and second references points.

12. An electrical line system according to claim 2, wherein said single conductors are arranged about said unsplit conductor so as to be substantially positioned on a circle.

13. An electrical line system according to claim 2, wherein said at least one magnetically compensated line system unit is a cable with insulation cover.

14. An electrical line system according to claim 13, wherein said cable carries single-phase current and comprises one of said split conductors and one of said unsplit conductors, wherein said single conductors and said unsplit conductor are each individually insulated and wherein said single conductors symmetrically surround said unsplit conductor.

15. An electrical line system according to claim 14, further comprising a neutral conductor, wherein said single conductors are arranged about said neutral conductor so as to be substantially positioned on a circle.

16. An electrical line system according to claim 14, further comprising a neutral conductor split into single neutral conductors, wherein said single neutral conductors surround said single conductors of said main conductors so as to be substantially positioned on a circle in order to shield against the formation of an external electrical field.

17. An electrical line system according to claim 16, further comprising a ground conductor arranged centrally with respect to said single conductors of said main conductors and said single neutral conductors.

18. An electrical line system according to claim 14, further comprising a ground conductor split into single ground conductors, wherein said single ground conductors surround said single conductors of said main conductors in order to shield against the formation of an external electrical field.

19. An electrical line system according to claim 13, wherein said cable carries polyphase current and comprises one of said split conductors for each phase of said polyphase current, wherein each one of said single conductors is insulated, and wherein all of said single conductors are substantially positioned on a circle.

20. An electrical line system according to claim 19, further comprising a neutral conductor, wherein said single conductors are arranged about said neutral conductor so as to be substantially positioned on a circle.

21. An electrical line system according to claim 19, further comprising a neutral conductor split into single neutral conductors, wherein said single neutral conductors surround said single conductors so as to be substantially positioned on a circle in order to shield against the formation of an external electrical field.

22. An electrical line system according to claim 21, further comprising a ground conductor arranged centrally with respect to said single conductors and said single neutral conductors.

23. An electrical line system according to claim 18, further comprising a ground conductor split into single ground conductors, wherein said single ground conductors surround said single conductors in order to shield against the formation of an external electrical field.

24. An electrical line system according to claim 13, wherein said cable has free ends, each one of said free ends comprising a connection device in the form of a plug, and wherein an electrical connection of said single conductors of each one of said split conductors is provided in each one of said connection devices.

25. An electrical line system according to claim 24, wherein said electrical line system further comprises a counter member for each one of said connection devices and wherein said counter members and said connection devices are embodied such that said connection device can be inserted into said counter member only in one position in which a neutral conductor of said connection device contacts a neutral conductor of said counter member.

26. An electrical line system according to claim 13, wherein said cable is configured as a twin lead and wherein said single conductors are slightly offset relative to a plane defined by said twin lead in which plane said unsplit conductor is positioned.

27. An electrical line system according to claim 26, wherein said cable carries polyphase current and wherein said single conductors are arranged in two planes that are essentially parallel to one another.

28. An electrical line system according to claim 2, wherein said at least one magnetically compensated line system unit is a buried cable unit for transmitting high voltage current and wherein said single conductors are in the form of separated conductors.

29. An electrical line system according to claim 2, wherein said single conductor has a cross-sectional area that is smaller than a cross-sectional area of said unsplit conductor.

30. An electrical line system according to claim 29, wherein a sum of said cross-sectional areas of said single conductors is substantially identical to said cross-sectional area of said unsplit conductor.

31. An electrical line system according to claim 2, wherein said single conductors of each one of said split conductors have the same identification markings.

32. An electrical line system according to claim 31, wherein said identification marking is a color code.

33. An electrical line system comprising:

at least one magnetically compensated line system unit comprising at least two main conductors for transmitting electrical energy and further comprising at least one auxiliary conductor extending parallel to said at least two main conductors;

said at least two main conductors and said at least one auxiliary conductor being phase-synchronized when said at least one auxiliary conductor carries current during operation of said electrical line system;

wherein said at least two main conductors and said at least one auxiliary conductor are arranged in a spatial arrangement relative to a first reference point in a first space extending parallel to said electrical line system, and wherein the currents flowing in said at least two main conductors and said at least one auxiliary conductor are selected such that a vector sum of the magnetic field components emanating from said at least two main conductors and said at least one auxiliary conductor is substantially equal to zero at said first reference point; and wherein said spatial arrangement is defined by a distance between said at least two main conductors and said at least one auxiliary conductor relative to said first reference point and by a spatial distribution of said at least two main conductors and said at least one auxiliary conductor relative to said first reference point;

wherein at least one of said two main conductors is a split conductor that is split into at least two single conductors and at least one of the remaining main conductors is an unsplit conductor;

wherein one of said single conductors functions as said at least one auxiliary conductor;

wherein said spatial arrangement of said at least two single conductors is determined as a function of the currents flowing in said unsplit conductor and said at least two single conductors such that the magnetic field of said unsplit conductor is at least approximately compensated by the magnetic field of said single conductors in said first space extending parallel to said electrical line system;

wherein said at least one magnetically compensated line system unit is a railway traction current system having a railway traction current line wherein a first one of said main conductors is an overhead contact line or a lateral contact line and wherein a second one of said main conductors is in the form of a track, wherein one of said first and second main conductors functions as said split conductor, and wherein said split conductor is formed by providing a separate conductor in addition to the respective main conductors.

34. An electrical line system according to claim 33, wherein said track functions as said split conductor and is comprised of two of said single conductors, with a first one of said single conductors being the railway track proper and with a second one of said single conductors being a separate conductor, wherein said separate conductor is arranged such as a function of the current flowing therethrough that a compensation of the magnetic field components takes place in said first space.

35. An electrical line system according to claim 33, wherein said separate conductor extends underground and parallel to said track.

36. An electrical line system according to claim 33, further comprising a transformer for supplying a compensation current and wherein said single conductors of said split conductor each have a first and a second end and are connected to one another with said first ends, wherein said transformer is connected to said second ends.

37. An electrical line system according to claim 33, further comprising a plurality of transformers for supplying a compensation current, wherein each one of said transformers is connected between ends of two of said single conductors of said split conductor.

38. An electrical line system according to claim 33, wherein said separate conductor is divided into short conductor sections, said electrical line system further comprising:

a sensor device, wherein said sensor device determines in which one of said short conductor sections current is flowing; and switching elements positioned between neighboring ones of said short conductor sections, wherein said switching elements supply compensation current only to those ones of said short conductor sections corresponding to portions of said first and second main conductors carrying current.

39. An electrical line system according to claim 38, wherein said sensor device is a magnetic field sensor.

40. An electrical line system according to claim 33, wherein a plurality of said separate conductors are provided substantially in parallel to said railway traction current line.

* * * * *

UNITED STATES PATENT AND TRADEMARK OFFICE
CERTIFICATE OF CORRECTION

PATENT NO. : 5,825,101
DATED : October 20, 1998
INVENTOR(S) : König

It is certified that error appears in the above-indentified patent and that said Letters Patent is hereby corrected as shown below:

On the title page, item:
    [73] Assignee: Dr. Fischer Aktiengesellschaft
                          Josef Rheinbergerstrasse 6
                          FL-9490 Vaduz, Liechtenstein Signed and Sealed this Tenth Day of August, 1999

*Attest:*

Q. TODD DICKINSON

*Attesting Officer*      *Acting Commissioner of Patents and Trademarks*